(12) United States Patent
Wang et al.

(10) Patent No.: US 12,416,989 B2
(45) Date of Patent: Sep. 16, 2025

(54) TOUCH PANEL AND HUMAN-COMPUTER INTERACTION METHOD BASED ON TOUCH PANEL

(71) Applicant: BOE TECHNOLOGY GROUP CO., LTD., Beijing (CN)

(72) Inventors: Shuai Wang, Beijing (CN); Dexing Qi, Beijing (CN); Hui Hua, Beijing (CN); Yingzi Wang, Beijing (CN); Dongsheng Huang, Beijing (CN); Li Zhou, Beijing (CN); Xiaoguang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/246,322

(22) PCT Filed: Apr. 28, 2022

(86) PCT No.: PCT/CN2022/089749
§ 371 (c)(1),
(2) Date: Mar. 22, 2023

(87) PCT Pub. No.: WO2023/206194
PCT Pub. Date: Nov. 2, 2023

(65) Prior Publication Data
US 2024/0319814 A1 Sep. 26, 2024

(51) Int. Cl.
G06F 3/041 (2006.01)
G06F 3/01 (2006.01)

(52) U.S. Cl.
CPC .......... *G06F 3/0416* (2013.01); *G06F 3/016* (2013.01); *G06F 3/04142* (2019.05); *G06F 2203/04105* (2013.01)

(58) Field of Classification Search
None
See application file for complete search history.

(56) References Cited

U.S. PATENT DOCUMENTS

| 8,633,916 | B2 | 1/2014 | Bernstein et al. |
| 10,921,628 | B2 | 2/2021 | Togashi |
| 2006/0028095 | A1 | 2/2006 | Maruyama et al. |
| 2007/0229478 | A1* | 10/2007 | Rosenberg .......... A63F 13/2145 345/173 |

(Continued)

FOREIGN PATENT DOCUMENTS

| CN | 102713805 A | 10/2012 |
| CN | 106020563 A | 10/2016 |

(Continued)

OTHER PUBLICATIONS

Extended European Search Report issued in EP Patent Application No. 22939046.3 (mailed Jan. 28, 2025).

*Primary Examiner* — Dorothy Harris
(74) *Attorney, Agent, or Firm* — Myers Bigel, P.A.

(57) ABSTRACT

This application discloses a touch panel and a human-computer interaction method based on a touch panel. The touch panel includes a base substrate, at least one pressure detector and at least one actuator arranged on the base substrate, and a driving circuit. The at least one pressure detector is electrically connected to the driving circuit, and the driving circuit is electrically connected to the at least one actuator.

14 Claims, 11 Drawing Sheets

(56) References Cited

U.S. PATENT DOCUMENTS

| | | | | |
|---|---|---|---|---|
| 2010/0027854 | A1* | 2/2010 | Chatterjee | G06F 3/03547 382/124 |
| 2010/0079264 | A1* | 4/2010 | Hoellwarth | G06F 3/016 340/407.2 |
| 2010/0128002 | A1* | 5/2010 | Stacy | G06F 3/0445 345/173 |
| 2010/0141410 | A1* | 6/2010 | Aono | G06F 3/016 345/173 |
| 2010/0141606 | A1 | 6/2010 | Bae et al. | |
| 2010/0156818 | A1* | 6/2010 | Burrough | G06F 3/04883 345/173 |
| 2010/0231550 | A1* | 9/2010 | Cruz-Hernandez | G06F 3/016 345/174 |
| 2010/0328229 | A1* | 12/2010 | Weber | G06F 1/1643 340/407.1 |
| 2011/0102355 | A1* | 5/2011 | Aono | G06F 3/016 345/173 |
| 2011/0141052 | A1* | 6/2011 | Bernstein | G06F 3/041 341/5 |
| 2011/0248916 | A1* | 10/2011 | Griffin | G06F 3/0416 345/157 |
| 2013/0016042 | A1 | 1/2013 | Makinen et al. | |
| 2015/0116233 | A1* | 4/2015 | Kono | G06F 3/041 345/173 |
| 2016/0306423 | A1* | 10/2016 | Uttermann | G06F 3/04144 |
| 2017/0205299 | A1* | 7/2017 | Zhang | G01L 15/00 |
| 2017/0357325 | A1* | 12/2017 | Yang | G06F 3/0443 |
| 2018/0081441 | A1* | 3/2018 | Pedder | G06F 3/03547 |
| 2018/0224348 | A1* | 8/2018 | Holm | G01L 9/0052 |
| 2019/0073036 | A1* | 3/2019 | Bernstein | G06F 1/1662 |
| 2019/0073079 | A1* | 3/2019 | Xu | G06F 3/0416 |
| 2019/0354222 | A1* | 11/2019 | Frescas | G06F 3/016 |
| 2020/0174571 | A1* | 6/2020 | Togashi | G06F 3/0443 |
| 2020/0218104 | A1* | 7/2020 | Togashi | B06B 1/0622 |
| 2021/0089182 | A1* | 3/2021 | Sheng | G06F 3/04886 |
| 2022/0137766 | A1* | 5/2022 | Hsu | G06F 3/04142 345/173 |
| 2022/0214790 | A1* | 7/2022 | Zhang | G06F 3/03547 |
| 2022/0269404 | A1* | 8/2022 | Huang | G06F 3/0414 |

FOREIGN PATENT DOCUMENTS

| | | | |
|---|---|---|---|
| CN | 207380668 U | 5/2018 | |
| CN | 108762582 A | 11/2018 | |
| CN | 109672765 A | 4/2019 | |
| CN | 110383215 A | 10/2019 | |
| CN | 110568960 A | 12/2019 | |
| CN | 210721367 U | 6/2020 | |
| CN | 111814572 A | 10/2020 | |
| CN | 214011959 U | 8/2021 | |
| WO | WO-2020065420 A1 * | 4/2020 | G06F 3/016 |

* cited by examiner

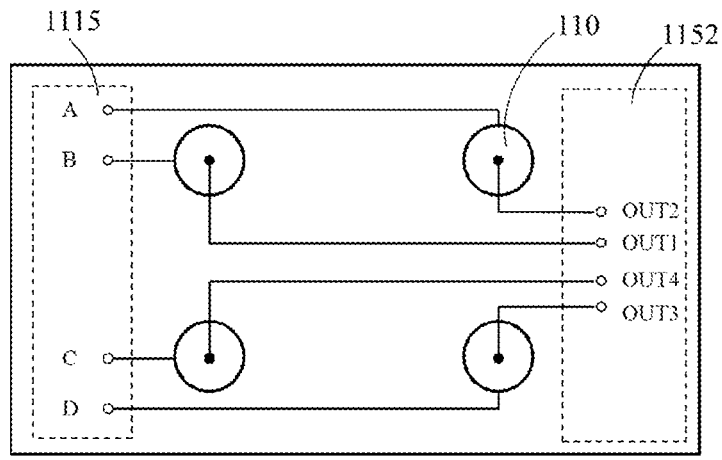

Fig. 21 generating a detection signal by the pressure detector based on the force applied by a user to the touch panel, and sending the detection signal to the driving circuit — S2205 determining whether the force applied by the user to the touch panel is greater than or equal to a preset trigger threshold by the driving circuit based on the detection signal — S2210 in response to the detection signal indicating that the force applied by the user to the touch panel is greater than or equal to the preset trigger threshold, generating an actuation signal by the driving circuit, and outputting the actuation signal to the actuator, to cause the actuator to produce tactile feedback to the user — S2215

Fig. 22

TOUCH PANEL AND HUMAN-COMPUTER INTERACTION METHOD BASED ON TOUCH PANEL

RELATED APPLICATION

The present application is a 35 U.S.C. 371 national stage application of a PCT International Application No. PCT/CN2022/089749, filed on Apr. 28, 2022, the content of which is incorporated herein by reference in its entirety.

FIELD

The present application relates to the fields of touch technology and tactile feedback, in particular to a touch panel and a human-computer interaction method based on touch panel.

BACKGROUND

Human-computer interaction based on touch panel is favored by users. Its fields of application are also gradually expanding. However, in the touch operation using the touch panel, some mistakes often occur. For example, the user touches the touch panel when he does not want to touch it (this situation can be referred to as fault touch), or the user does not touch the desired position when performing a touch operation, but touches the other positions (this situation can be referred to as false touch). These mistakes will affect the accuracy and efficiency of user operations and reduce the user experience.

SUMMARY

According to an aspect of the present disclosure, there is provided a touch panel, comprising: a base substrate, at least one pressure detector and at least one actuator arranged on the base substrate, and a driving circuit, wherein the at least one pressure detector is electrically connected to the driving circuit, and the driving circuit is electrically connected to the at least one actuator.

In some embodiments, a ratio of a quantity of the at least one actuator and a quantity of the at least one pressure detector is in a range of 1:4 to 2:1.

In some embodiments, the at least one actuator comprises a plurality of actuators, and the plurality of actuators are arranged in an array comprising at least two rows and at least two columns, wherein every four actuators that are directly adjacent constitute a sub-array which is parallelogram, and orthographic projections of the four actuators constituting the sub-array on the base substrate define a sub-region as vertices, wherein an orthographic projection of each of the at least one pressure detector on the base substrate is in a corresponding sub-region.

In some embodiments, each sub-region corresponds to one pressure detector, wherein an orthographic projection of the one pressure detector on the base substrate is at a geometric center of the corresponding sub-region.

In some embodiments, each sub-region corresponds to two pressure detectors, wherein an arrangement direction of orthographic projections of the two pressure detectors on the base substrate is parallel to a row direction or a column direction of the array of the plurality of actuators.

In some embodiments, the sub-region is divided into two regions by its midline, and the orthographic projections of the two pressure detectors on the base substrate are respectively at geometric centers of the two regions.

In some embodiments, each sub-region corresponds to four pressure detectors, wherein the four pressure detectors constitute a parallelogram as vertices, wherein, extension directions of the two sets of opposite sides of the parallelogram are respectively parallel to the row direction and the column direction of the array of the plurality of actuators.

In some embodiments, the at least one pressure detector and the at least one actuator are arranged in a same layer.

In some embodiments, an orthographic projection of each pressure detector of the at least one pressure detector on the base substrate at least partially overlaps with an orthographic projection of a corresponding actuator of the at least one actuator on the base substrate.

In some embodiments, the at least one pressure detector and the at least one actuator are arranged in different layers.

In some embodiments, each pressure detector of the at least one pressure detector comprises an input terminal and an output terminal, and the driving circuit comprises at least one detection signal output terminal and at least one detection signal receiving terminal, wherein the input terminal of each pressure detector is electrically connected to a corresponding detection signal output terminal of the driving circuit, and the output terminal of each pressure detector is electrically connected to a corresponding detection signal receiving terminal of the driving circuit.

In some embodiments, the input terminal of each pressure detector is electrically connected to a same detection signal output terminal of the driving circuit.

In some embodiments, each pressure detector comprises a capacitive device, the capacitive device comprises a first electrode, a second electrode, and an insulator between the first electrode and the second electrode, wherein the first electrode is used as the input terminal of each pressure detector, and the second electrode is used as the output terminal of each pressure detector.

In some embodiments, each pressure detector comprises a piezoelectric device, the piezoelectric device comprises a first electrode, a second electrode and a piezoelectric material layer between the first electrode and the second electrode, wherein the first electrode is used as the input terminal of each pressure detector, and the second electrode is used as the output terminal of each pressure detector.

In some embodiments, each pressure detector comprises a piezoresistive device, the piezoresistive device comprises a first electrode, a second electrode and a piezoresistive material layer between the first electrode and the second electrode, wherein the first electrode is used as the input terminal of each pressure detector, and the second electrode is used as the output terminal of each pressure detector.

In some embodiments, each actuator of the at least one actuator comprises an input terminal and an output terminal, the driving circuit comprises at least one actuation signal output terminal and a ground terminal, wherein the input terminal of each actuator is electrically connected to a corresponding actuation signal output terminal of the driving circuit, and the output terminal of each actuator is electrically connected to the ground terminal of the driving circuit.

In some embodiments, the actuator comprises a piezoelectric device, the piezoelectric device comprises a first electrode, a second electrode, and a piezoelectric material layer between the first electrode and the second electrode, wherein the first electrode is used as the input terminal of the actuator, and the second electrode is used as the output terminal of the actuator.

In some embodiments, the driving circuit comprises at least one detection signal output terminal, at least one detection signal receiving terminal, at least one actuation signal output terminal, and a ground terminal, wherein the at least one detection signal output terminal and the at least one detection signal receiving terminal are electrically connected to the at least one pressure detector, and the at least one actuation signal output terminal and the ground terminal are electrically connected to the at least one actuator, wherein the at least one detection signal output terminal and the at least one detection signal receiving terminal are located at a first edge of the touch panel, and the at least one actuation signal output terminal and the ground terminal are located at a second edge of the touch panel, wherein the first edge is opposite to the second edge.

In some embodiments, the touch panel is divided into a touch area and a frame area surrounding the touch area, wherein the at least one pressure detector and/or the at least one actuator are located in the frame area.

In some embodiments, the touch panel further comprises a touch layer, wherein the touch layer is configured to determine a touch location.

In some embodiments, the at least one pressure detector is arranged in the touch layer.

According to another aspect of the present disclosure, there is provided a touch panel, comprising: at least one piezoelectric device, and a driving circuit, wherein each of the at least one piezoelectric device comprises a piezoelectric material layer having a first end surface and a second end surface, and a first electrode arranged on the first end surface and a second electrode arranged on the second end surface, wherein the first electrode is electrically connected to a signal output terminal of the driving circuit, and the second electrode is electrically connected to a signal receiving end of the driving circuit, wherein the driving circuit is configured to determine a pressure on the piezoelectric device by detecting a first voltage difference between the signal output terminal and the signal receiving terminal during a first period, and, driving the piezoelectric device to implement tactile feedback by providing a second voltage difference between the signal output terminal and the signal receiving terminal during a second period.

In some embodiments, the signal output terminal of the driving circuit is located at a first edge of the touch panel, the signal receiving terminal of the driving circuit is located at a second edge of the touch panel, wherein the first edge is opposite to the second edge.

According to another aspect of the present disclosure, there is provided a human-computer interaction method based on a touch panel comprising a pressure detector, an actuator and a driving circuit, comprising: generating a detection signal by the pressure detector based on the force applied by a user to the touch panel, and sending the detection signal to the driving circuit; determining whether the force applied by the user to the touch panel is greater than or equal to a preset trigger threshold by the driving circuit based on the detection signal; in response to the detection signal indicating that the force applied by the user to the touch panel is greater than or equal to the preset trigger threshold, generating an actuation signal by the driving circuit, and outputting the actuation signal to the actuator, to cause the actuator to produce tactile feedback to the user.

In some embodiments, the touch panel further comprises a touch sensor, and the method further comprises: generating a location signal by the touch sensor based on a touch location of the user, and sending the location signal to the signal controller, and, the step of generating the actuation signal by the driving circuit comprises: generating the actuation signal by the driving circuit based on the location signal, such that the actuator produces tactile feedback to the user at the touch location.

BRIEF DESCRIPTION OF DRAWINGS

In order to describe the technical solutions in the embodiments of the present disclosure more clearly, the drawings that need to be used in the embodiments will be briefly introduced below. Apparently, the drawings in the following description are only some embodiments of the present disclosure, and those skilled in the art can obtain other drawings according to these drawings without creative efforts. In the drawings, the same or similar elements may be represented by the same or similar patterns or symbols. It should be understood that unless otherwise specified, the patterns or symbols in the drawings are only used to distinguish elements, but not to limit the shapes of the elements. In the drawings of this application:

FIG. 21 schematically shows an internal circuit diagram of a touch panel according to an embodiment of the present application;

FIG. 22 schematically shows a flowchart of a human-computer interaction method based on a touch panel according to an embodiment of the present application;

DETAILED DESCRIPTION

Figure 1:
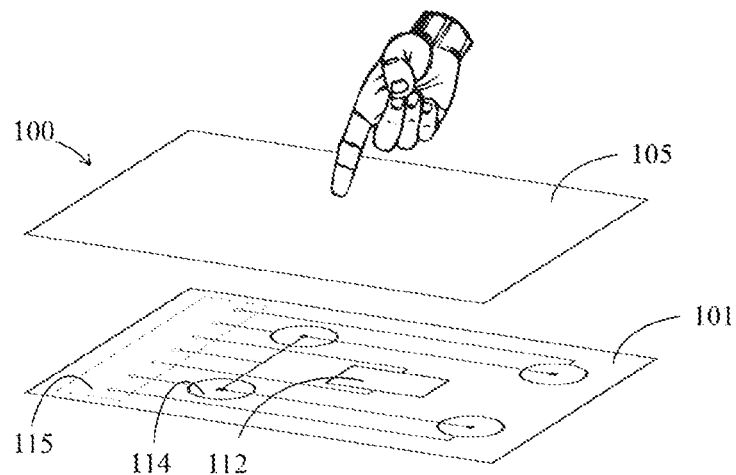
FIG. 1 schematically shows a perspective view of a touch panel according to an embodiment of the present application.

The technical solutions in the embodiments of the present disclosure will be described with reference to the drawings in the embodiments of the present disclosure. Apparently, the described embodiments are only some of the embodiments of the present disclosure, not all of them. All other embodiments obtained by persons of ordinary skill in the art based on the described embodiments without making creative efforts belong to the protection scope of the present disclosure.

A touch style human-computer interaction can be carried out through physical keys or touch panels. When physical keys are used as the input manner, the position of each key is fixed, and the function of each key is single. In order to achieve more different interactions, the quantity of keys needs to be increased. This will take up more space, and there are also challenges in the reasonable arrangement of the key positions. Moreover, as the quantity of keys increases, it will be more difficult for the user to quickly find the desired key, and the operation speed and accuracy will be relatively low.

In contrast, when a touch panel is used as the input manner, the touch panel can be instantly partitioned in different forms according to different scenarios. This makes, in different scenarios, touching the same part of the touch panel may produce different input effects. Therefore, if it is only to achieve more interactions, the touch panel does not need to have a large touch area, so that the volume of the touch panel will not be greatly limited. With the variety of input effects and the freedom of volume control, the touch panel has a good prospect.

It should be noted that, in the context of this application, the term "panel" is to be understood as such a structure: in three mutually perpendicular dimensions, the structure extends significantly longer in two of the dimensions than in the other one, so that the structure as a whole can be regarded as a flat structure. However, it is not excluded that the flat structure may contain multiple layers parallel to each other. On this basis, "touch panel" can be understood as any panel-type human-computer interaction device that collects input information based on the user's touch operation for subsequent processing.

The inventor of the present application found that in some scenarios, the user may easily make mistakes when using the touch panel to operate, including the aforementioned fault touch and false touch. These mistakes are even unavoidable in some scenes. Specifically, when operating the touch panel, in order to enable the user to accurately touch the corresponding position of the touch panel, the user usually needs to observe the positions of the touch panel and the device or body parts used to contact the touch panel (for example, a stylus, fingers, etc.), with the help of vision. However, in some scenarios, the user may need to use vision for seeing other things. For example, when driving a vehicle, the driver needs to observe the surroundings of the vehicle, but cannot (and should not) focus on the touch panel located on the center console. Moreover, even if the limitation of the scenario is not considered, for example, even if the human eye can focus on assisting touch operation, a small part of the panel will inevitably be blocked by the device or body parts touching the touch panel because the device or body parts touching the touch panel is between the human eye and the touch panel. When the touch resolution of the touch panel is high, that is, on the touch panel per unit area, the quantity of areas that produce different touch results is relatively large (that is, the area of each touch unit is small), this block may cause errors. Therefore, mistakes may be unavoidable when performing touch operations.

In view of this, the inventor of the present application believes that some solutions can be proposed so that mistakes will not affect the touch operation, or the mistakes can be discovered by the user as early as possible so that the user can correct them as soon as possible. This helps to solve the aforementioned problems and improves the user's interactive experience.

Figure 2:
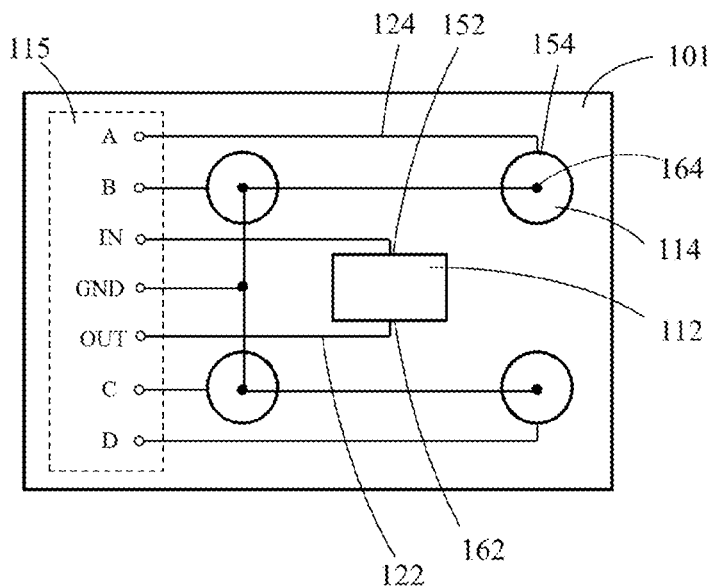
FIG. 2 schematically shows an internal circuit diagram of a touch panel according to an embodiment of the present application.

According to one aspect of the present application, a touch panel is provided. FIG. 1 schematically shows a perspective view of a touch panel according to an embodiment of the present application. FIG. 2 schematically shows an internal circuit diagram of a touch panel according to an embodiment of the present application. As shown in FIG. 1, in some embodiments, the touch panel 100 includes a base substrate 101, at least one pressure detector 112 and at least one actuator 114 arranged on the base substrate, and a driving circuit 115. The at least one pressure detector 112 is electrically connected to the driving circuit 115, and the driving circuit 115 is electrically connected to the at least one actuator 114. In the touch panel 100, the base substrate 101 plays a role of carrying the pressure detector 112 and the actuator 114, so that the pressure detector 112 and the actuator 114 are fixedly installed in the touch panel 100. However, this does not mean that pressure detector 112 and actuator 114 are in direct contact with base substrate 101. For example, in some embodiments, there may be other structures between the pressure detector 112 and the actuator 114 and the base substrate 101. The driving circuit 115 can be arranged directly or indirectly on the base substrate 101, and can also be arranged at other positions in the touch panel 100.

As shown in FIG. 2, in the embodiments of the present application, the pressure detector 112 is electrically connected to the driving circuit 115 (for example, through the detection circuit 122), so electrical signals can be transmitted between the pressure detector 112 and the driving circuit 115. At the same time, the driving circuit 115 is electrically connected to the actuator 114 (for example, through the feedback circuit 124), so electrical signals can also be transmitted between the driving circuit 115 and the actuator 114. In this case, the driving circuit 115 can establish a relationship between the pressure detector 112 and the actuator 114. For example, the actuator 114 can be made to actuate the touch panel 100 according to the electrical signal generated by the pressure detector 112 to provide tactile feedback to the user. Since the actuation of the actuator 114 is based on the electrical signal generated by the pressure detector 112, when the user feels the tactile feedback, he can have a better understanding of the operation performed on the touch panel. If the actual operation performed by the user is inconsistent with the user's expected operation, this tactile feedback can make the user aware of the inconsistency in time, so that the user can adjust its next operation as soon as possible.

The term "tactile feedback" can be understood as when the user directly touches the touch panel through body parts, or indirectly touches the touch panel through some auxiliary equipment, the touch panel can provide information to the user through this contact. For example, as shown in FIG. 1, the touch panel 100 may include a cover plate 105. When the user operates the touch panel 100, the user's fingers may be in contact with the cover plate 105. The actuator 114 can actuate the cover plate 105, causing the cover plate to generate mechanical vibration. Since the user is in contact with the touch panel 105, he can feel the vibration through the tactile sense, and thus know the information provided by the touch panel 100. In addition, in this application, since the vibration caused by the actuator 114 depends on the operation applied by the user detected by the pressure detector 112, the information provided by the touch panel 100 to the user through the tactile sense is a kind of feedback information on the user's operation, so this information-providing activity of the touch panel can be called tactile feedback.

The term "actuation" can be understood as that the actuator 114 causes deformation or displacement of the touch panel 100 or certain components therein (e.g., the cover plate 105). That is, the touch panel 100 is not static when providing tactile feedback to the user, but can be considered to be in motion.

The touch panel 100 according to the embodiments of the present application and its components are described in more detail below.

The pressure detector 112 is first described. In the embodiment of the present application, the force applied by the user on the touch device 100 can be transmitted to the pressure detector 112 inside the touch device. Under the action of the pressure, the pressure detector 112 can change the electrical properties of its internal structure material according to certain rules. This change in electrical properties can be represented by an electrical signal. This electrical signal may be referred to as a detection signal in this application. The detection signal will vary with the force applied to the touch device 100 by the user. By detecting and processing the detection signal, some properties of the force, such as the magnitude of the pressure, can be determined. In this application, the above process may be referred to as pressure detection for short.

In some embodiments, pressure detection may be accomplished through force sensitive sensors. For example, the force sensitive sensor may be a capacitive sensor including a capacitive device, a piezoelectric sensor including a piezoelectric device, or a piezoresistive sensor including a piezoresistive device, etc. These sensors are described below.

Capacitive sensors can include capacitive devices. A capacitive device may include a first electrode and a second electrode, and an insulator interposed between the two electrodes. When a capacitive sensor is used for pressure detection, the pressure applied by the user on the touch panel will cause a certain change in the distance between the two electrodes of the capacitive sensor, thereby changing its capacitance value. The amount of change in the capacitance value can be output in the form of an electrical signal. By measuring the electrical signal, properties of the pressure applied by the user, such as the magnitude of the pressure, can be determined. Since the relationship between the capacitance value of the capacitive sensor and the distance between the two electrodes is a nonlinear relationship, in some embodiments, the pressure detector may also include a measurement circuit with a compensation function, to non-linearly compensate the output electrical signal. Capacitive sensors have the advantages of good temperature stability, simple structure, good dynamic response, and high sensitivity.

Piezoelectric sensors may include piezoelectric devices. The piezoelectric device includes a piezoelectric material layer having a first end surface and a second end surface, and a first electrode and a second electrode arranged on the two end surfaces of the piezoelectric material layer (that is, the piezoelectric material layer is interposed between the first electrode and the second electrodes). The term "piezoelectric material layer" should be understood as that the first electrode, the piezoelectric material layer, and the second electrode are stacked together in a layer-by-layer manner. But this is not intended to limit the size of each dimension of the piezoelectric material layer. When a piezoelectric sensor is used to realize pressure detection, based on the positive piezoelectric effect, when the piezoelectric material layer is under pressure, charges of opposite signs are generated on its two end surfaces. When the pressure is removed, the piezoelectric material layer returns to its uncharged state. Therefore, by outputting the voltage change between the two electrodes on the two end faces in the form of electrical signal, and detecting the electrical signal, the property of the pressure can be determined. The piezoelectric material forming the piezoelectric material layer can be a single crystal material such as quartz, potassium sodium tartrate, etc. The piezoelectric material may also be a polycrystalline material, such as a piezoelectric ceramic material, specifically barium titanate, lead zirconate titanate, lead magnesium niobate, and the like. In addition, some new polymer materials, such as polyvinylidene fluoride (PVDF), can also be used as piezoelectric materials. Additionally, the piezoelectric material may include a dielectric elastomer material. In some embodiments, the dielectric elastomer material may include silicone rubber, acrylate elastomers, polyurethane elastomers, nitrile rubber, vinylidene fluorinated trifluoroethylene, and combinations thereof. In some embodiments, in order to reduce the driving voltage of the dielectric elastomer, some high dielectric fillers, such as titanium oxide ($TiO_2$), barium titanate ($BaTiO_3$), etc., may be added into the dielectric elastomer. Generally, the amount of charge generated by a piezoelectric material is proportional to the magnitude of the external force. In addition, the piezoelectric material itself is non-conductive, so it is possible that it can play an electrical insulation role between other components in the touch panel.

Piezoresistive sensors may include piezoresistive devices. The piezoresistive device includes a first electrode, a second electrode, and a piezoresistive material layer between the two electrodes. The term "piezoresistive material layer" should not be interpreted as limiting the size of each dimension of the piezoresistive material layer. Based on the piezoresistive effect, the resistivity of the piezoresistive material (such as single crystal silicon) forming the piezoresistive material layer will change when it is subjected to a force. Through the corresponding measurement circuit, the electrical signal output proportional to the force change can be obtained. In some embodiments, in order to improve detection accuracy and sensitivity, the piezoresistive sensor may include multiple piezoresistive devices, and the multiple piezoresistive devices are connected in the form of a Wheatstone bridge. The specific implementation manner will be described in detail in the following embodiments.

The actuator 114 will be described next. The actuator 114 of the embodiment of the present application is electrically connected to the driving circuit 115. The driving circuit 115 receives the detection signal from the pressure detector 112, and sends an actuation signal to the actuator 114 based on the detection signal. After the actuator 114 receives the actuation signal, it actuates the touch panel 100 or certain components inside it (such as the cover plate 105), so that the touch panel 100 provides tactile feedback to the user. In this application, the above process may be referred to as tactile feedback for short.

In tactile feedback, the actuator 114 converts the received electrical signal into mechanical deformation or displacement. This deformation or displacement of the actuator 114 itself will be transmitted to the user who is in contact with the touch panel 100 via other elements in the touch panel 100. In this way, the user can feel the deformation or displacement through the tactile sense, so as to know the information that the touch panel 100 wants to convey to the user.

In some embodiments, the actuator 114 may include a piezoelectric device. The piezoelectric device includes a first electrode, a second electrode, and a piezoelectric material layer interposed between the first electrode and the second electrode. When an electrical signal is applied to the two end faces of the piezoelectric material layer, the piezoelectric material expands or contracts, converting electrical energy into mechanical energy. As mentioned above, piezoelectric materials may include crystalline piezoelectric materials and dielectric elastomer materials, and specific material types will not be repeated here.

Next, the driving circuit 115 will be described. In some embodiments, the driving circuit 115 can be arranged in the same layer as the pressure detector 112 or the actuator 114. For example, as shown in FIG. 1, the pressure detector 112 and the actuator 114 are arranged in the same layer. The driving circuit 115 can be arranged in the same layer as the pressure detector 112 and the actuator 114, or can be arranged in a different layer from the pressure detector 112 and the actuator 114. The pressure detector 112 is electrically connected to the driving circuit 115, and the driving circuit 115 is electrically connected to the actuator 114. The term "electrically connected" can be understood to mean that electrical signals can be transferred between two or more devices described by the term. The transmission of such electrical signals can be realized by means of physical elements such as wires, or can be realized wirelessly such as by means of electromagnetic waves. Other devices may or may not be present between electrically connected devices. That is, electrical signals may be directly transmitted between electrically connected devices, or may flow through devices other than these devices.

In the embodiment of the present application, since the pressure detector 112 is electrically connected to the driving circuit 115, the detection signal generated by the pressure detector 112 can be transmitted to the driving circuit 115. Since the driving circuit 115 is electrically connected to the actuator 114, the actuation signal issued by the driving circuit 115 can be transmitted to the actuator 114, so that the actuator 114 actuates other components in the touch panel 100 to generate tactile feedback. In a specific embodiment, various ports are arranged on the driving circuit 115, and the pressure detector 112 and the actuator 114 can be connected to these ports. The driving circuit can receive detection signals and output actuation signals through these ports.

In the embodiment of the present application, the driving circuit 115 can be configured to determine whether to generate and send an actuation signal based on the detection signal, and when it is determined that the actuation signal will be generated, further determine the specific content of the actuation signal based on the detection signal, so that the tactile feed generated by the touch panel is associated with the user's operation on the touch panel 100. In some embodiments, the driving circuit 115 may be logic computing devices with data processing capabilities and/or program execution capabilities, such as central processing units (CPUs), field programmable logic arrays (FPGAs), single-chip microcomputers (MCUs), digital driving circuits (DSPs), and application-specific integrated circuits (ASICs).

Since the touch panel of the embodiment of the present application has the above-mentioned devices, and there is an electrical connection between the above-mentioned devices, the touch panel can realize pressure detection and provide tactile feedback based on the pressure detection. Therefore, when using the touch panel of the embodiment of the present application, the user can have a more accurate understanding of the operations performed on the touch panel through the tactile sense. For example, since the tactile feedback is based on pressure detection, the strength of tactile feedback can reflect the strength of the force applied on the touch panel by the user. For example, in some embodiments, when the pressure applied by the user is greater, the tactile feedback provided to the user is stronger, such as the vibration of the touch panel is stronger. In this way, if the user feels a strong vibration on the touch panel, it may indicate that the user's operation is too strong, so the user can immediately change the operation to avoid damage the touch panel. In terms of touch, people can feel vibrations in the ultrasonic frequency band. When the vibration frequency is from 100 Hz to 1000 Hz, especially from 100 Hz to 300 Hz, people can feel relatively obvious vibration through touch. In addition, even if the user already accurately understand the operation performed on the touch panel by other sensory means (such as vision or hearing), the touch panel according to the embodiment of the present application can enhance and enrich the user's experience through the tactile sense. For example, when the user is exerting high pressure, it may indicate that the user is engaged in intense activity (such as a game in the middle of an intense phase). At this time, a strong tactile feedback can be provided for the user, so that the user can obtain stimulation through touch in addition to vision and hearing, which enriches the sensory experience of the user.

As mentioned above, the operation performed by the user on the touch panel 100 can occur on the cover plate 105, and the actuator 114 can also provide tactile feedback by actuating the cover plate 105. The cover plate 105 is described below.

When the user imposes touch operations on the touch panel, the user can exert a certain force on the cover plate 105 of the touch panel 100. This force can be transmitted to pressure detector 112. The pressure detector 112 generates a detection signal in response to the force. The driving circuit 115 is electrically connected to the pressure detector 112, and receives the detection signal. Then, the driving circuit generates and outputs an actuation signal based on the detection signal.

The user's operation on the cover plate 105 generally exerts a force on the cover plate. The force has a component perpendicular to the cover plate 105. In some specific descriptions of this application, the force perpendicular to the cover plate is also referred to as the pressure on the cover plate. In the embodiment of the present application, the cover plate 105 can transmit the pressure to the pressure detector 112. Additionally, the cover plate 105 is actuated by the actuator 114 to provide tactile feedback to the user. In order to cooperate with the above pressure detection and tactile feedback functions, the cover plate 105 needs to have certain hardness and elasticity. In some embodiments, the material of cover plate 105 may include one or more plastics, such as polyimide (PI), polymethyl methacrylate (PMMA), polycarbonate (PC), polyethylene terephthalate (PET), polyethylene naphthalate (PEN), polyvinylidene chloride, polyvinylidene fluoride (PVDF), polystyrene, ethylene vinyl alcohol copolymer, polyethersulfone (PES), polyetherimide (PEI), polyphenylene sulfide (PPS), polyacrylate, triacetyl cellulose (TAC), cellulose acetate propionate (CAP), etc. In other embodiments, the material of the cover plate 105 may include glass, such as transparent glass or translucent glass (e.g., frosted glass). In other embodiments, in order to increase the performance of the cover plate, such as impact resistance, the cover plate may be a structure formed by stacking multiple layer structures, or even a structure formed by stacking layers of different materials.

In the touch panel 100, the positional relationship between the actuator 114 and the pressure detector 112 will affect the effect of pressure detection and tactile feedback. Next, the positional relationship between pressure detector 112 and actuator 114 will be described.

Figure 3:
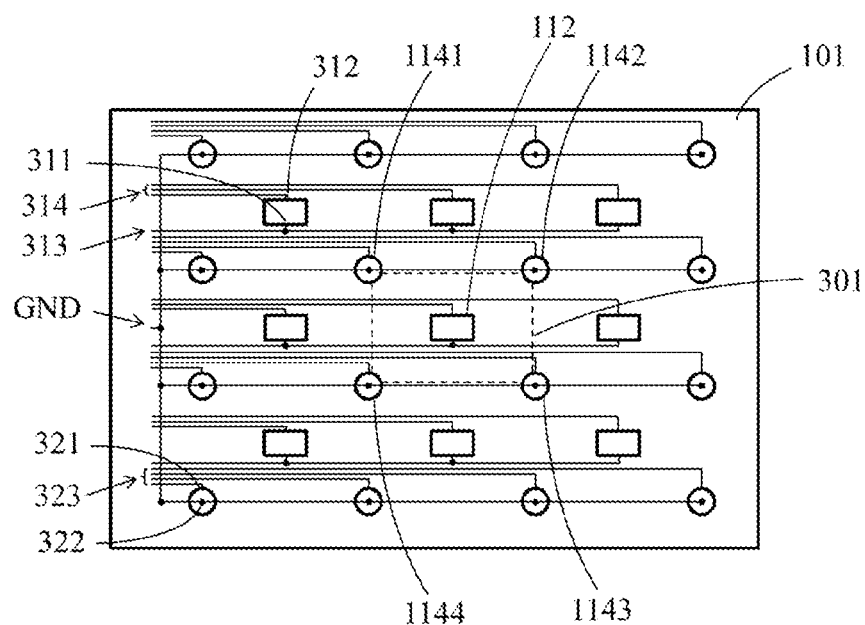
FIG. 3 schematically shows an internal circuit diagram of a touch panel according to an embodiment of the present application.

FIG. 3 schematically shows an internal circuit diagram of a touch panel according to an embodiment of the present application. In some embodiments, the at least one actuator 114 includes a plurality of actuators, and the plurality of actuators are arranged in an array comprising at least two rows and at least two columns. In the array of actuators 114, every four actuators 114 that are directly adjacent constitute a sub-array of parallelogram, and the orthographic projections of the four actuators 114 constituting the sub-array on the base substrate 101 are used as vertices to define the sub-region 301. For clarity of the drawings, FIG. 3 only shows one sub-region 301. It should be understood, however, that any four directly adjacent actuators 114 will define a sub-region 301. The orthographic projection of each pressure detector 112 on the base substrate 101 is located in the corresponding sub-region 301. The term "directly adjacent" means that the row and column numbers of these actuators 112 in the array differ by one. For example, all of four actuators that satisfy the following relationship between row number and column number are "directly adjacent" actuators: the first actuator is located at row m and column n of the array, and the second actuator is located at row m and column n+1 of the array, the third actuator is located at row m+1 and column n of the array, and the fourth actuator is located at row m+1 and column n+1 of the array, wherein m and n are both positive integers. It should be understood that no matter what values m and n are, the difference between m and m+1 is always 1, and the difference between n and n+1 is also always 1. The four actuators that constitute the sub-array are adjacent in both the row direction and the column direction. In the embodiment of the present application, the four actuators can be arranged as vertices of a parallelogram, or even as vertices of a rectangle, a square, or a trapezoid. The term "orthographic projection" should be understood as the projection of an element on a surface along a direction perpendicular to the surface. The base substrate can be understood as a planar structure whose length and width are significantly greater than the thickness. Therefore, the orthographic projections of the actuator and the pressure detector on the base substrate can be understood as the perpendicular projections of the actuator and the pressure detector on the surface defined by the length and width directions of the base substrate.

The orthographic projection of each pressure detector 112 on the base substrate 101 is located in the corresponding sub-region 301, indicating that each pressure detector 112 is arranged between four actuators 114. That is, in the touch panel, the pressure detector 112 is interspersed between the actuators 114, and the actuators are arranged on the periphery of the pressure detector. This interspersed arrangement facilitates the uniform distribution of the pressure detectors 112 and the actuators 114 in the touch panel, so as to detect the pressure more accurately and provide tactile feedback at a more ideal position.

As shown in FIG. 3, four directly adjacent actuators 1141, 1142, 1143, 1144 form a parallelogram sub-array, such as the rectangular sub-array shown in FIG. 3. The orthographic projections of actuators 1141, 1142, 1143, and 1144 on base substrate 101 define the sub-region 301 as vertices.

In some embodiments, each sub-region corresponds to a pressure detector. That is to say, only one pressure detector is arranged between every four directly adjacent actuators. As shown in FIG. 3, in such an embodiment, a row of pressure detectors 112 is arranged between every two adjacent rows of actuators 114. A column of pressure detectors 112 is arranged between every two adjacent columns of actuators 114. The quantities of rows and columns of pressure detectors 112 are one less than the quantities of rows and columns of actuators 114, respectively.

In a more specific embodiment, the orthographic projection of the one pressure detector between every four directly adjacent actuators on the base substrate 101 is located at the geometric center of the corresponding sub-region. This makes the relative position between the pressure detector and the four actuators corresponding to the sub-region relatively symmetrical, and makes the spacing between the rows of pressure detectors the same and the spacing between the columns of pressure detectors the same. This makes the accuracy of pressure detection at each position of the touch panel more consistent.

FIG. 3 also schematically shows the wiring of the pressure detectors 112 and the actuator 114. As shown in FIG. 3, each pressure detector 112 includes an input terminal 311 and an output terminal 312. The input terminal 311 of each pressure detector is electrically connected to the corresponding detection signal output terminal 313 of the driving circuit, and the output terminal 312 of each pressure detector is electrically connected to the corresponding detection signal receiving terminal 314 of the driving circuit. In order to reduce the quantity of wiring and reduce the wiring density, the input terminals of multiple pressure detectors can be electrically connected to the same detection signal output terminal of the driving circuit. For example, in the embodiment of FIG. 3, the input terminals 311 of each row of pressure detectors are electrically connected to the same detection signal output terminal 313 of the driving circuit.

As shown in FIG. 3, each actuator 114 includes an input terminal 321 and an output terminal 322. The input terminal 321 of each actuator 114 is electrically connected to the corresponding actuation signal output terminal 323 of the driving circuit, and the output terminal 322 of each actuator 114 is electrically connected to the ground terminal GND of the driving circuit. It should be noted that the quantities of pressure detectors and actuators shown in FIG. 3 should not be construed as a limitation on the quantities of pressure detectors and actuators in the touch panel of the embodiment of the present application.

In other embodiments, each sub-region corresponds to two pressure detectors. The arrangement direction of the orthographic projections of the two pressure detectors on the base substrate is parallel to the row direction or the column direction of the array of the plurality of actuators.

Figure 4:
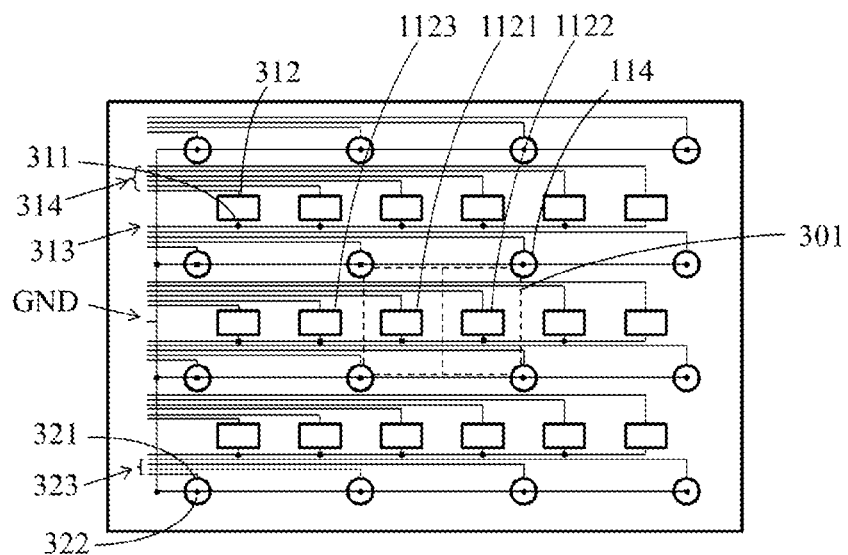
FIG. 4 schematically shows an internal circuit diagram of a touch panel according to an embodiment of the present application.

FIG. 4 schematically shows an internal circuit diagram of a touch panel according to an embodiment of the present application. As shown in FIG. 4, each sub-region 301 corresponds to two pressure detectors 1121 and 1122. That is to say, two pressure detectors are arranged between every four directly adjacent actuators 114. In this way, a row of pressure detectors 112 is located between every two adjacent rows of actuators 114. Two columns of pressure detectors are arranged between every two adjacent columns of actuators 114. The number of rows of the pressure detectors 112 is one less than the number of rows of the actuators 114. The number of columns of the actuators 114 is one more than half the number of columns of the pressure detectors 112. Compared with the embodiment in FIG. 3, the number of columns of the pressure detectors in the embodiment in FIG. 4 is doubled, that is, the number of pressure detectors is doubled.

In a more specific embodiment, as shown in FIG. 4, the sub-region 301 is divided into two regions by its midline. The orthographic projections of the two pressure detectors 1121 and 1122 on the base substrate 101 are respectively located at the geometric centers of these two regions. In this way, from the perspective of the sub-region 301, the two pressure detectors 1121 and 1122 corresponding to the sub-region are arranged symmetrically within the sub-region. From the perspective of multiple sub-regions, the intervals of pressure detectors in adjacent sub-regions are also equal. For example, the interval between two pressure detectors 1121 and 1122 within a single sub-region 301 is half the lateral width of the sub-region. The distance between the pressure detector 1121 and the pressure detector 1123 in the adjacent sub-region is also half of the lateral width of the sub-region. This makes the spacing of the pressure detectors within each row of pressure detectors consistent. With this setting, when the quantity of pressure detectors is doubled, the spacing between the pressure detectors in each row is still equal.

The embodiment of FIG. 4 can also be understood in this way. The sub-region 301 is divided into four regions by three quarterlines (including a first quarterline, a second quarterline, and a third quarterline) extending in the column direction. The second quarterline lies between the first quarterline and the third quarterline. Among the two pressure detectors corresponding to sub-region 301, one pressure detector is located at the midpoint of the first quarterline, and the other pressure detector is located at the midpoint of the third quarterline. FIG. 4 also shows the wiring of the pressure detectors and actuators. As shown in FIG. 4, the input terminal 311 of each pressure detector is electrically connected to the corresponding detection signal output terminal 313 of the driving circuit, and the output terminal 312 of each pressure detector is electrically connected to the corresponding detection signal receiving terminal 314 of the driving circuit. Furthermore, in the embodiment shown in FIG. 4, the input terminals 311 of each row of pressure detectors are electrically connected to the same detection signal output terminal 313 of the driving circuit. In addition, as shown in FIG. 4, the input terminal 321 of each actuator is electrically connected to the corresponding actuation signal output terminal of the driving circuit. The output terminal 322 of each actuator is electrically connected to the ground terminal GND of the driving circuit. Similar to FIG. 3, the quantities of pressure detectors and actuators shown in FIG. 4 should not be construed as limiting the quantities of pressure detectors and actuators in the touch panel of the embodiment of the present application.

Figure 5:
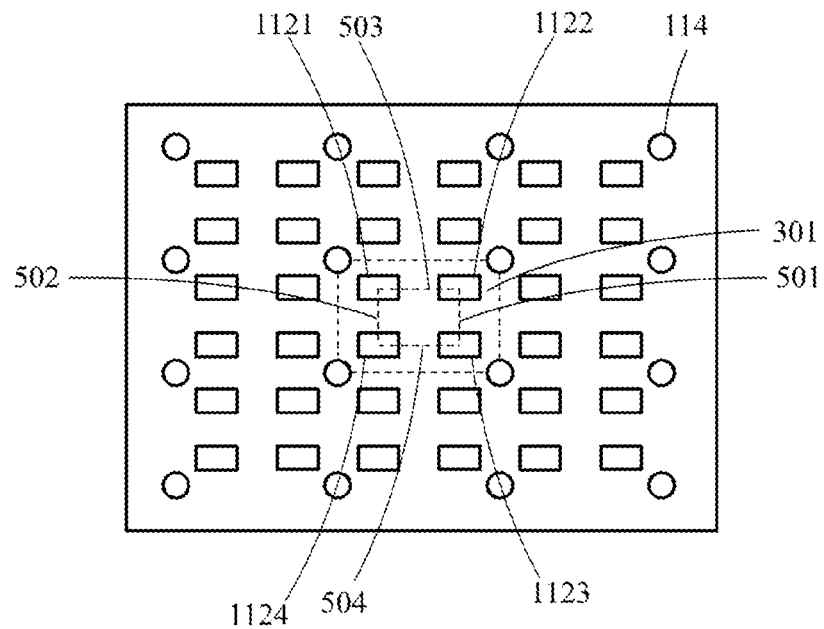
FIG. 5 schematically shows an internal circuit diagram of a touch panel according to an embodiment of the present application.

In some embodiments, each sub-region corresponds to four pressure detectors. The four pressure detectors constitute a parallelogram as vertices, such as a rectangle. The extension directions of two sets of opposite sides of the parallelogram formed by the four pressure detectors are respectively parallel to the row direction and the column direction of the array of the plurality of actuators. FIG. 5 schematically shows an internal circuit diagram of a touch panel according to an embodiment of the present application. As shown in FIG. 5, each sub-region 301 corresponds to four pressure detectors 1121, 1122, 1123, 1124. The pressure detectors 1121, 1122, 1123, and 1124 form a parallelogram (for example, a rectangle shown in FIG. 5) as vertices. Also, a set of opposite sides 501, 502 of the parallelogram are parallel to the column direction of the array of actuators 114. The other set of opposite sides 503, 504 of the parallelogram is parallel to the row direction of the array of actuators 114. Through this arrangement, the arrangement direction of the pressure detectors is consistent with the arrangement direction of the actuator, which is conducive to the uniform distribution of the two devices. Due to the limitation of drawing space, the wiring of pressure detectors and actuators is not shown in FIG. 5. However, on the basis of FIG. 3 and FIG. 4, those skilled in the art can think of the wiring mode of the pressure detectors and actuators in FIG. 5.

In some embodiments, for example, in the foregoing embodiments shown in FIG. 3 to FIG. 5, the pressure detector 112 and the actuator 114 may be arranged in the same layer, or may be arranged in different layers. The term "arranged in the same layer" can be understood as that two elements overlap at least partially in a direction perpendicular to the layer. For example, in a direction perpendicular to a layer, the bottom surface of one element is closer to the layer than the top surface of the other element.

In order to reduce the density of electrical devices in the one layer, thereby reducing the wiring density, the pressure detectors and actuators can be arranged in different layers. The term "arranged in different layers" can be understood to mean that two elements do not coincide in the direction perpendicular to the layers, for example, along the direction perpendicular to the layer, the bottom surface of one element is further away from the layer than the top surface of the other element.

Figure 6:
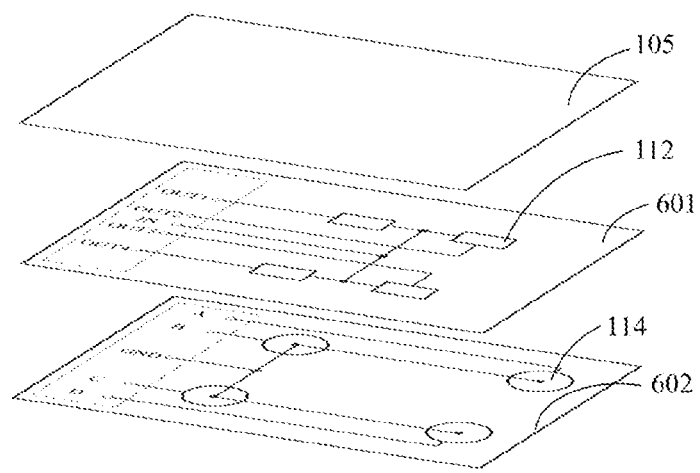
FIG. 6 schematically shows a perspective view of a touch panel according to an embodiment of the present application.
Figure 7A:
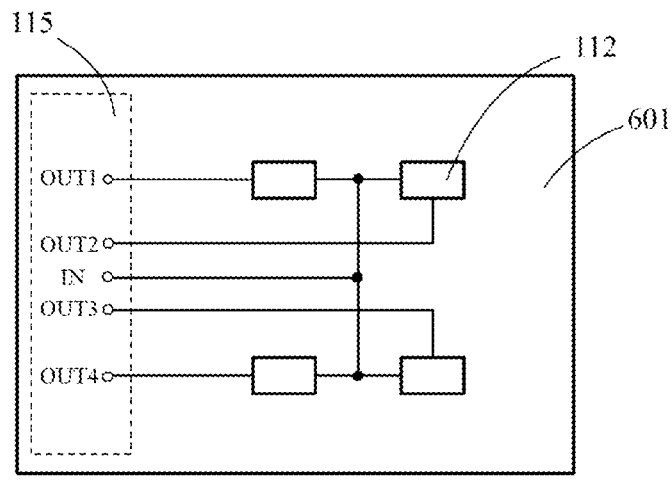
FIG. 7A and FIG. 7B schematically show an internal circuit diagram of a touch panel according to an embodiment of the present application.
Figure 7B:
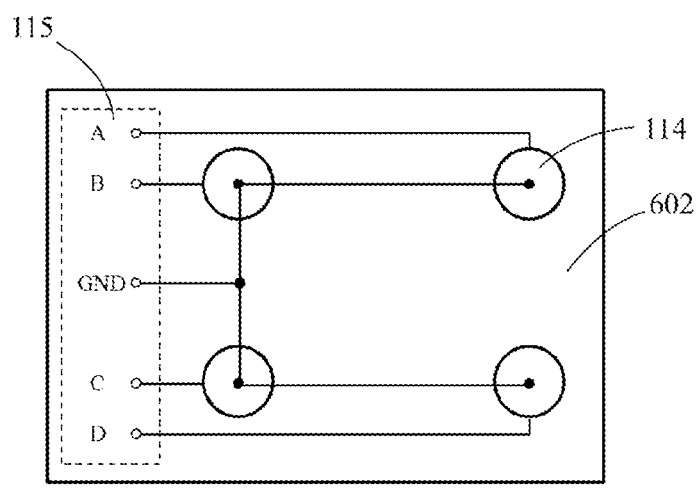

FIG. 6 schematically shows a perspective view of a touch panel according to an embodiment of the present application. FIG. 7A and FIG. 7B respectively schematically show the internal circuit diagram of the touch panel according to the embodiment of the present application. As shown in FIG. 6, the pressure detectors 112 are located in the first layer 601, and the actuators 114 are located in the second layer 602. As shown in FIG. 7A and FIG. 7B, the quantity of elements and the quantity of wirings in each layer are small, which can effectively avoid interference between electrical signals. In some embodiments, as shown in FIG. 6, the first layer 601 where the pressure detectors 112 are located is closer to the interaction interface between the user and the touch panel 100, such as the cover plate 105, than the second layer 602 where the actuators 114 are located. In this way, the pressure detectors 112 are closer to the user's touch location, so that the detection of the force applied by the user is more accurate. As a comparison, although the actuators 114 are farther away from the user's touch location, by adjusting the actuation signal, the actuator 114 can also provide desired touch feedback.

Figure 8:
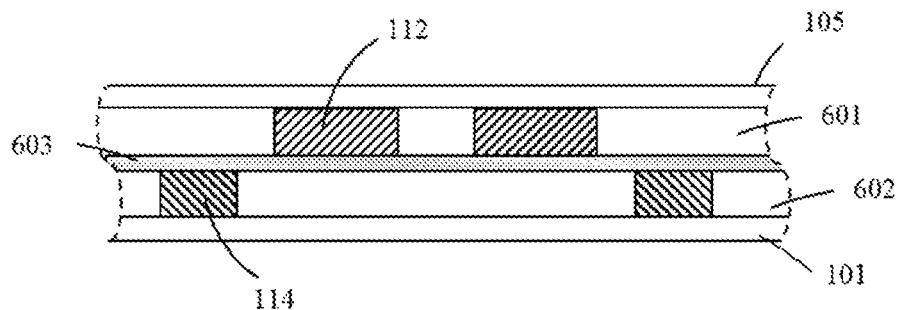
FIG. 8 schematically shows a partial cross-sectional view of a touch panel according to an embodiment of the present application.

FIG. 8 schematically shows a cross-sectional view of a touch panel according to an embodiment of the present application. As shown in FIG. 8, in some embodiments, an insulating layer 603 may also exist between the first layer 601 and the second layer 602 to better electrically isolate the pressure detectors 112 from the actuators 114 and the wirings of these two components.

Figure 9:
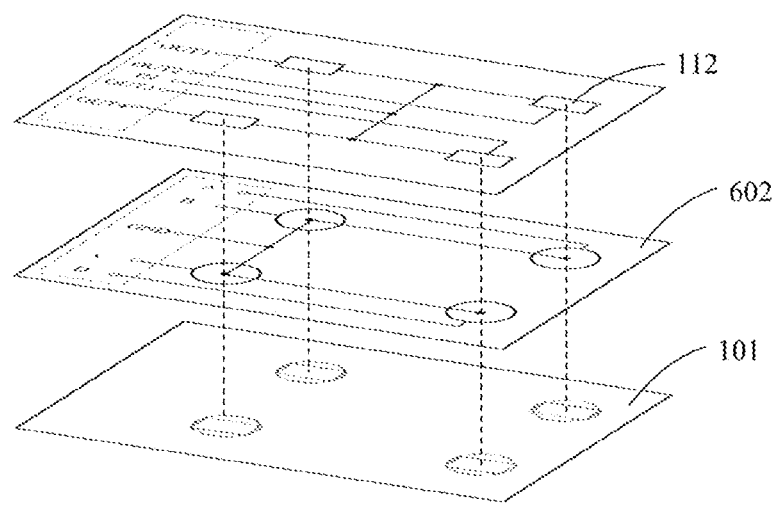
FIG. 9 schematically shows a perspective view of a touch panel according to an embodiment of the present application.

In some embodiments, the orthographic projection of each of the at least one pressure detector on the base substrate at least partially overlaps the orthographic projection of the corresponding actuator of the at least one actuator on the base substrate. FIG. 9 schematically shows a perspective view of a touch panel according to an embodiment of the present application. As shown in FIG. 9, the orthographic projection of each pressure detector 112 on the base substrate 101 overlaps at least partially with the orthographic projection of the actuator 114 on the base substrate 101. In other words, the pressure detector 112 and the actuator 114 at corresponding position are stacked in a direction substantially perpendicular to the base substrate 101.

According to the terminal device where the touch panel is located, the size of the touch panel, and the specific application scenario of the touch panel, the quantity and ratio of pressure detectors and actuators can be different. For example, in some embodiments, the ratio of the quantity of the at least one actuator to the quantity of the at least one pressure detector is in the range of 1:4 to 2:1. By setting the quantity ratio of the two components within the above range, the quantities of the two components will be relatively close and the distribution will be relatively uniform, and a better balance between pressure detection and tactile feedback can be achieved. When the quantity of pressure detectors is relatively large, for example, when the ratio of the quantity of pressure detectors to the quantity of actuators is 2:1, the sensitivity of the touch panel is higher.

Next, the electrical connection of the pressure detectors 112 and the actuators 114 with the driving circuit 115 will be described. In some embodiments, each pressure detector of the at least one pressure detector includes an input terminal and an output terminal, and the driving circuit includes at least one detection signal output terminal and at least one detection signal receiving terminal. The input terminal of each pressure detector is electrically connected to the corresponding detection signal output terminal of the driving circuit, and the output terminal of each pressure detector is electrically connected to the corresponding detection signal receiving terminal of the driving circuit.

FIG. 2 shows the electrical connections between pressure detectors and actuators with the driving circuit. As shown in FIG. 2, for example, the pressure detector 112 can be connected to the ports of the driving circuit 115 through the detection circuit 122. Specifically, the input terminal 152 of the pressure detector 112 can be connected to the detection signal output terminal IN of the driving circuit 115. The output terminal 162 of the pressure detector 112 can be connected to the detection signal receiving terminal OUT of the driving circuit 115. The detection signal output terminal IN provides an input signal to the pressure detector 112, and the detection signal output by the pressure detector 112 is received by the driving circuit 115 via the detection signal receiving terminal OUT.

As mentioned earlier, the pressure detector can be a capacitive sensor, a piezoelectric sensor, or a piezoresistive sensor. The internal structures of these sensors and their electrical connections to the driving circuit will be described below.

When the pressure detector is a capacitive sensor, each pressure detector includes a capacitive device. The capacitive device includes a first electrode, a second electrode, and an insulator interposed between the first electrode and the second electrode. In this case, the first electrode serves as the input terminal 152 of the pressure detector and is electrically connected to the detection signal output terminal IN. The second electrode serves as the output terminal 162 of the pressure detector and is electrically connected to the detection signal receiving terminal OUT.

When the pressure detector is a piezoelectric sensor, each pressure detector includes a piezoelectric device. The piezoelectric device includes a first electrode, a second electrode, and a piezoelectric material layer between the first electrode and the second electrode. In this case, the first electrode serves as the input terminal 152 of the pressure detector and is electrically connected to the detection signal output terminal IN. The second electrode serves as the output terminal 162 of the pressure detector and is electrically connected to the detection signal receiving terminal OUT.

When the pressure detector is a piezoresistive sensor, each pressure detector includes a piezoresistive device. The piezoresistive device includes a first electrode, a second electrode, and a piezoresistive material layer between the first electrode and the second electrode. In this case, the first electrode serves as the input terminal 152 of each pressure detector and is electrically connected to the detection signal output terminal IN. The second electrode serves as the output terminal 162 of each pressure detector and is electrically connected to the detection signal receiving terminal OUT.

Figure 10:
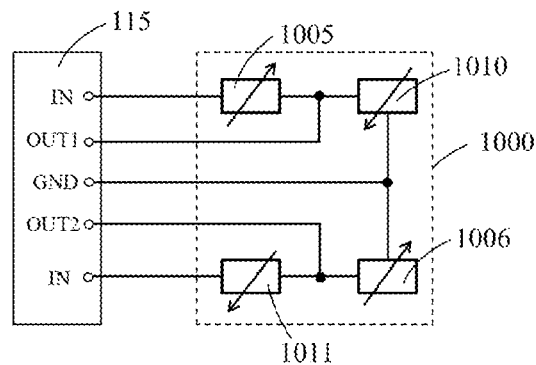
FIG. 10 schematically shows an internal circuit diagram of a touch panel according to an embodiment of the present application.

As mentioned above, in order to improve the detection accuracy and sensitivity, each pressure detector can include multiple piezoresistive devices, and multiple piezoresistors can be connected in the form of a Wheatstone bridge. This is described in more detail below. FIG. 10 schematically shows an internal circuit diagram of a touch panel according to an embodiment of the present application. Specifically, FIG. 10 shows an internal circuit of a piezoresistive sensor 1000 that can be used in the embodiment of the present application.

As shown in FIG. 10, a piezoresistive sensor 1000 may include two positive piezoresistors 1005, 1006 and two negative piezoresistors 1010, 1011. When a positive piezoresistor is subjected to pressure, its resistance value increases; when a negative piezoresistor is subjected to pressure, its resistance value decreases. The positive piezoresistor 1005 is connected in series with the negative piezoresistor 1010, and the negative piezoresistor 1011 is connected in series with the positive piezoresistor 1006. The series circuit composed of positive piezoresistor 1005 and negative piezoresistor 1010 and the series circuit composed of negative piezoresistor 1011 and positive piezoresistor 1006 are connected in parallel. The driving circuit 115 provides an input signal to the piezoresistive sensor 1000 through the detection signal output terminal IN. The input signal reaches the positive piezoresistor 1005 and the negative piezoresistor 1011 respectively. It should be noted that although two detection signal output terminals IN are shown in FIG. 10, in other embodiments, the same detection signal output terminal IN can be used to provide input signals for the positive piezoresistor 1005 and the negative piezoresistor 1011. The piezoresistive sensor 1000 includes two output terminal ports, which are respectively connected to two detection signal receiving terminals OUT1 and OUT2 of the driving circuit 115. The potential of the port OUT1 corresponds to the potential between the positive piezoresistor 1005 and the negative piezoresistor 1010, and the potential of the port OUT2 corresponds to the potential between the negative piezoresistor 1011 and the positive piezoresistor 1006. After the pressure applied by the user on the touch panel is transmitted to the piezoresistive sensor 1000, the resistance values of the positive and negative piezoresistors change inversely. As the pressure increases, the potential between the positive piezoresistor 1005 and the negative piezoresistor 1010 decreases, causing the voltage received by the port OUT1 to decrease; the potential between the negative piezoresistor 1011 and the positive piezoresistor 1006 increases, causing voltage received by the port OUT2 to increase, and the specific voltage values of the two ports can be determined by the following formulas (1) and (2):

$$V_{out1} = V_{in} \times R_{1010}/(R_{1005} + R_{1010}) \quad (1)$$

$$V_{out2} = V_{in} \times R_{1006}/(R_{1011} + R_{1006}) \quad (2)$$

in which, $V_{out1}$ represents the voltage value detected at the port OUT1, $V_{out2}$ represents the voltage value detected at the port OUT2, $V_{in}$ represents the voltage of the input signal provided by the port IN, $R_{1005}$, $R_{1006}$, $R_{1010}$, $R_{1011}$ represent the resistance values of positive piezoresistor 1005, positive piezoresistor 1006, negative piezoresistor 1010, and negative piezoresistor 1011. In this way, in response to the increase of pressure, the difference between the voltage $V_{out2}$ received by the port OUT2 and the voltage $V_{out1}$ received by the port OUT1 ($V_{out2}-V_{out1}$) is increased, and the increase is greater than the change in the voltage difference across a single piezoresistor. By arranging the piezoresistors of the piezoresistive sensor 1000 in the form of the above-mentioned Wheatstone bridge, the changes of the piezoresistors after being pressed are accumulated and amplified, thereby improving the sensitivity and precision of pressure detection.

Next, the electrical connection between the actuators 114 and the driving circuit 115 will be described. In some embodiments, each actuator includes an input terminal and an output terminal, and the driving circuit includes at least one actuation signal output terminal and a ground terminal. The input terminal of each actuator is electrically connected to the corresponding actuation signal output terminal of the driving circuit, and the output terminal of each actuator is electrically connected to the ground terminal of the driving circuit.

FIG. 2 also shows the electrical connection between the actuators 114 and the driving circuit 115. As shown in FIG. 2, for example, the actuator 114 may be connected to ports of the driving circuit 115 through feedback circuit 124. For example, the input terminal 154 of the actuator 114 is electrically connected to a corresponding one of the actuation signal output terminals A, B, C, and D of the driving circuit 115. The output terminal 164 of the actuator 114 is electrically connected to the ground terminal GND of the driving circuit 115. The actuation signal output terminals A, B, C, and D provide the actuation signal to the actuator 114, so that the actuator 114 is deformed or displaced. The ground terminal GND is a common port electrically connected to each actuator 114, which may be a port in the driving circuit 115, or other ports in the touch panel 100 that can provide ground potential. The detection circuit 122 and the feedback circuit 124 can be formed using conductive materials, such as metal. In this embodiment, in the same row of actuators 114, the actuation signal output terminal to which the actuator closer to the driving circuit 115 is connected is closer to the midline of the row than the actuation signal output terminal to which the actuator farther from the driving circuit 115 is connected. For example, the signal output terminal B is closer to the row direction midline of the first row of actuators in FIG. 2 than the signal output terminal A. The row direction midline means the midline parallel to the extension direction of the row of actuators.

In some embodiments, the actuator includes a piezoelectric device. The piezoelectric device includes a first electrode, a second electrode, and a piezoelectric material layer between the first electrode and the second electrode. The first electrode serves as the input terminal of the actuator and is electrically connected to a corresponding one of the actuation signal output terminals A, B, C, and D. The second electrode serves as the output terminal of the actuator and is electrically connected to the ground terminal port GND.

Figure 11:
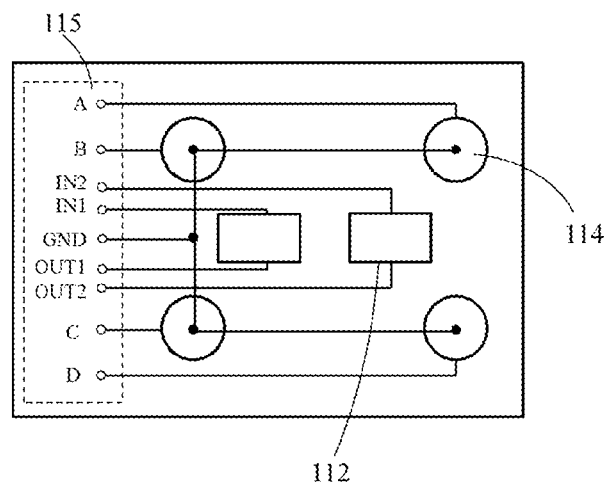
FIG. 11 schematically shows an internal circuit diagram of a touch panel according to an embodiment of the present application.

FIG. 11 schematically shows an internal circuit diagram of a touch panel according to an embodiment of the present application. As shown in FIG. 11, compared with the embodiment shown in FIG. 2, the quantity of pressure detectors 112 is doubled, so that the pressure detection sensitivity is increased, and the pressure detection capability and tactile feedback capability of the touch panel are more balanced. FIG. 11 shows the layout of the connection circuit between the pressure detectors 112, the actuators 114 and the driving circuit 115. The quantity of ports for pressure detection of the driving circuit 115 is also doubled, including the detection signal output terminals IN1 and IN2, and the detection signal receiving terminals OUT1 and OUT2. The pressure detector 112 closer to the driving circuit 115 is connected to the detection signal output terminal IN1 and the detection signal receiving terminal OUT1, and the pressure detector 112 farther from the driving circuit 115 is connected to the detection signal output terminal IN2 and the detection signal receiving terminal OUT2. The detection signal output terminal IN1 and the detection signal receiving terminal OUT1 are closer to the row direction midline of the row of the pressure detectors 112 than the detection signal output terminal IN2 and the detection signal receiving terminal OUT2. The row direction midline refers to the midline parallel to the extending direction of the row of pressure detectors 112.

Figure 12:
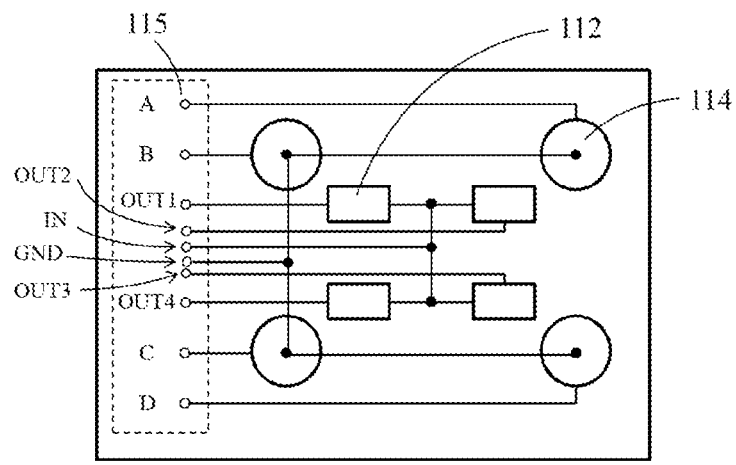
FIG. 12 schematically shows an internal circuit diagram of a touch panel according to an embodiment of the present application.

FIG. 12 schematically shows an internal circuit diagram of a touch panel according to an embodiment of the present application. As shown in FIG. 12, compared with the embodiment shown in FIG. 11, the quantity of pressure detectors 112 is doubled. The quantity of detection signal receiving terminals of the driving circuit 115 for receiving the detection signal is correspondingly increased to four, including port OUT1, port OUT2, port OUT3, and port OUT4. The driving circuit 115 determines and processes the detection signals (such as voltage signals) received by each detection signal receiving terminal, so that the properties of the pressure received by each pressure detector 112 can be determined more accurately, thereby improving the sensitivity of pressure detection.

In some embodiments, in order to reduce the amount of wiring, the input terminal of each pressure detector is electrically connected to the same detection signal output terminal IN of the driving circuit. When multiple pressure detectors are included in the touch panel, these pressure detectors can share the same detection signal output terminal IN to receive the input signal and be connected to different detection signal receiving terminal OUT respectively. For example, in FIG. 12, the driving circuit 115 provides an input signal to each pressure detector 112 through only one detection signal output terminal IN, and the detection signal output terminal IN is respectively connected to the input terminal of each pressure detector 112.

In some embodiments, all ports of the driving circuit 115 are arranged on one side of the touch panel. For example, as shown in FIG. 2, FIG. 11, and FIG. 12, the detection signal output terminal IN, detection signal receiving terminal OUT, actuation signal output terminal A, B, C, D, and ground terminal GND of the driving circuit 115 are all arranged on the left side of the touch panel. That is, the detection circuit and the feedback circuit, starting from the pressure detector 112 and the actuator 114 respectively, both extend to one side of the touch panel. This arrangement may be referred to simply as a "same-side" arrangement of the detection circuit and the feedback circuit.

In another embodiment, the detection circuit and the feedback circuit, respectively starting from the pressure detectors 112 and the actuators 114, extend to opposite sides of the touch panel. This arrangement can be referred to simply as a "different side" arrangement of the detection circuit and the tactile feedback circuit. In this "different side" arrangement, the ports of the driving circuit 115 electrically connected to the pressure detectors and the ports of the driving circuit 115 electrically connected to the actuators are respectively located on opposite sides of the touch panel. For example, the driving circuit includes at least one detection signal output terminal, at least one detection signal receiving terminal, at least one actuation signal output terminal, and a ground terminal. The at least one detection signal output terminal and the at least one detection signal receiving terminal are electrically connected to the at least one pressure detector. The at least one actuation signal output terminal and the ground terminal are electrically connected to the at least one actuator. The at least one detection signal output terminal and the at least one detection signal receiving terminal are located at the first edge of the touch panel. The at least one actuation signal output terminal and the ground terminal are located at the second edge of the touch panel. The first edge is opposite the second edge.

Figure 13:
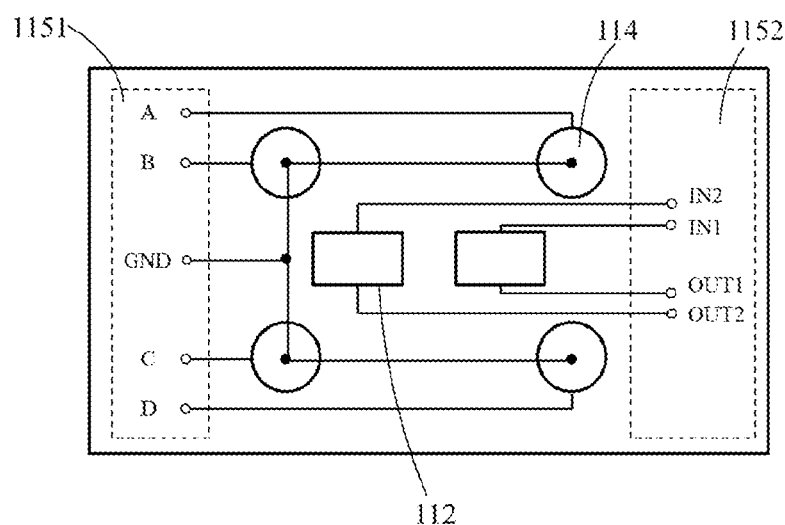
FIG. 13 schematically shows an internal circuit diagram of a touch panel according to an embodiment of the present application.

FIG. 13 schematically shows an internal circuit diagram of a touch panel according to an embodiment of the present application. As shown in FIG. 13, the driving circuit may include two subsections, namely, a first subsection 1151 and a second subsection 1152. The first subsection 1151 and the second subsection 1152 are located on opposite sides of the touch panel. The actuation signal output terminals A, B, C, D, and the ground terminal GND for electrical connection with the actuators 114 are arranged in the first subsection 1151. The detection signal output terminals IN1, IN2 and the detection signal receiving terminals OUT1, OUT2 for electrical connection with the pressure detectors 112 are arranged in the second subsection 1152. This can avoid the situation where the ports of the driving circuit and the wiring of the actuators and the pressure detectors are too concentrated on one side of the touch panel, thereby reducing the port density and wiring density on one side of the touch panel, which is conducive to the overall wiring balance of the touch panel.

Figure 14:
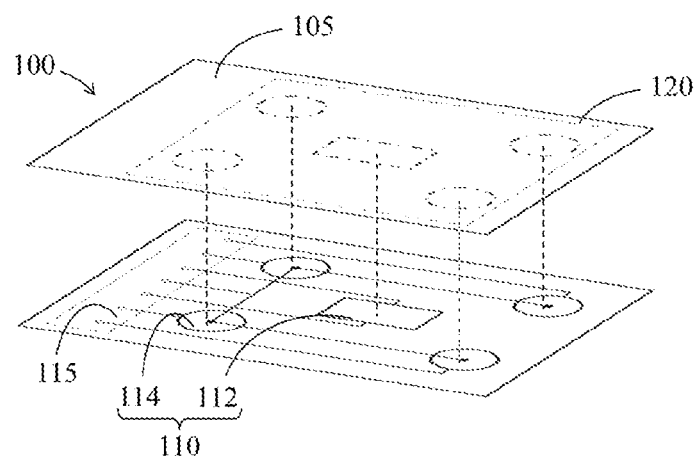
FIG. 14 schematically shows a perspective view of a touch panel according to an embodiment of the present application.

In some embodiments, the touch panel may include a touch area. The touch area is the area where the user makes contact with the touch panel when performing a touch operation. That is to say, when the user uses the touch panel for touch operation, the user is actually operating within the touch area of the touch panel. FIG. 14 schematically shows a perspective view of a touch panel according to an embodiment of the present application. As shown in FIG. 14, in some embodiments, the touch panel includes a touch area 120. For example, the touch area 120 may be an area divided from the cover plate 105. When using the touch panel 100, the user mainly operates in the touch area 120. The force applied by the user on the touch panel is mainly applied directly within the touch area 120.

In some embodiments, the locations of the pressure detectors 112 and the actuators 114 correspond to the touch area 120. For example, the orthographic projections of the pressure detectors 112 and the actuators 114 on the cover plate 105 are located within the touch area 120. This can also be understood as, in these embodiments, the pressure detectors 112 and the actuators 114 adopt an "under-screen" arrangement. In this way, the pressure detectors 112 and the actuators 114 will be closer to the user's touch location, the measurement of the force applied by the user will be more accurate, and the tactile feedback felt by the user will be closer to the tactile feedback expected to be provided to the user.

In addition to arranging both the pressure detectors 112 and the actuators 114 at positions corresponding to the touch area, in some other embodiments, the positions of the pressure detectors 112 and/or the actuators 114 may also correspond to the outside of the touch area. For example, in some embodiments, the touch panel is divided into a touch area and a frame area surrounding the touch area. The at least one pressure detector and/or the at least one actuator are located in the frame area. For example, the pressure detector 112 is arranged outside the touch area of the touch panel, or the actuator 114 is arranged outside the touch area of the touch panel, or both the pressure detector 112 and the actuator 114 are arranged outside the touch area of the touch panel. This is especially suitable for touch panels with display functions, because it prevents the above two devices from affecting the light transmission effect of the touch panel.

Figure 15:
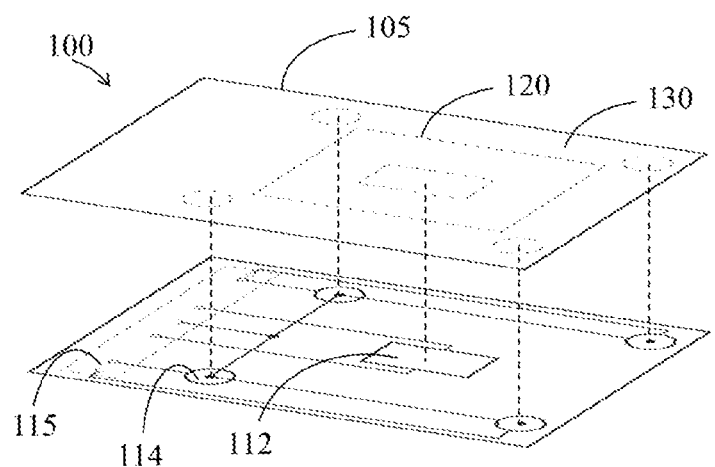
FIG. 15 schematically shows a perspective view of a touch panel according to an embodiment of the present application.

When higher pressure detection accuracy is required, the pressure detectors 112 can be arranged inside the touch area of the cover plate, and the actuators 114 can be arranged outside the touch area of the cover plate. FIG. 15 schematically shows a perspective view of a touch panel according to an embodiment of the present application. As shown in FIG. 15, in some embodiments, the touch panel includes a touch area 120 and a frame area 130 surrounding the touch area 120. The touch area and frame area can be two parts of the cover plate. The orthographic projection of the pressure detector 112 on the cover plate 105 is located in the touch area 120, and the orthographic projection of the actuator 114 on the cover plate 105 is located in the frame area 130. Through this arrangement, firstly, it is ensured that the pressure detector can be closer to the user's touch location, so as to improve the detection accuracy, and the actuator 114 can actuate the cover plate without affecting the display function in the touch area 120.

In some embodiments, the touch panel may also have a touch location detection function. For example, the touch location of the user on the touch panel can be determined through the touch location detection function. Moreover, the tactile feedback function can also be combined with the touch location detection function. For example, the tactile feedback can be made to happen at the touch location, or the specific content of the tactile feedback can be related to the touch location, such as informing the user the specific location they are touching through the tactile feedback.

Figure 16:
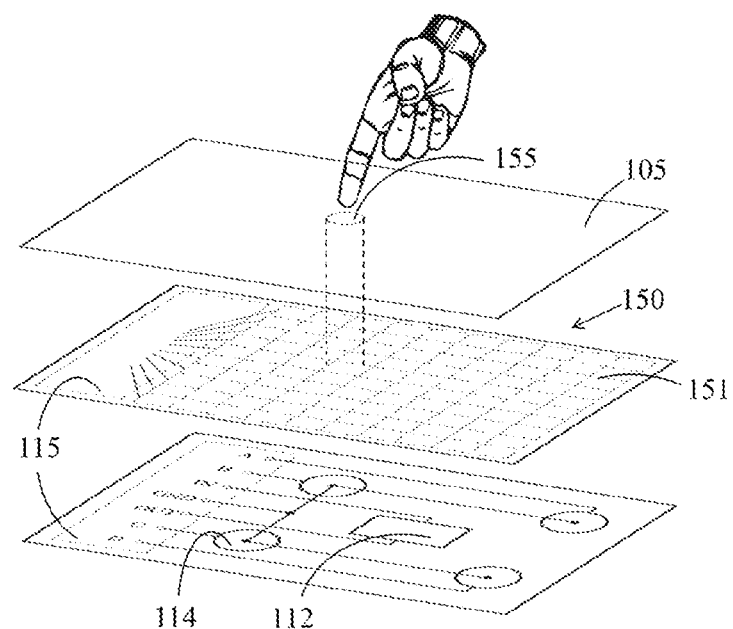
FIG. 16 schematically shows a perspective view of a touch panel according to an embodiment of the present application.

FIG. 16 schematically shows a perspective view of a touch panel according to an embodiment of the present application. As shown in FIG. 16, the touch panel also includes a touch layer 150. The touch layer includes a touch sensor 151, and the touch sensor 151 is electrically connected to the driving circuit 115. The touch layer 150 is configured to detect a touch location 155, and send a location signal indicating the touch location 155 to the driving circuit 115.

The touch sensor 151 can be any detector capable of converting position information into electrical signals. The touch layer 150 may be a layer structure within the touch panel. In some embodiments, touch layer 150 is disposed between the layer of cover plate 105 and the layer where the pressure detector 112 is located. When the user operates the touch panel, the electrical property of the touch sensor 151 corresponding to the contact position (i.e., the touch location) between the user and the touch panel may be changed and output in the form of an electrical signal. When the electrical signal is detected, it can be considered that the position of the touch sensor is the user's touch location. After determining the touch location, the driving circuit can generate an actuation signal based on the touch location. In this way, the tactile feedback provided by the touch panel can be related to the user's touch location. For example, when the actuation signal is generated, the generated actuation signal can be enabled to actuate the actuator 114 closest to the touch location. This reduces the energy loss in vibration in the process of transfer from the actuator 114 to the touch location. Or, in some embodiments, when the actuation signal is generated, the generated actuation signal can drive multiple actuators, and the actuations of the multiple actuators can be superimposed on each other, so that the tactile feedback is located at the touch location. For example, the actuation signal generated by the driving circuit can control the vibration amplitude and frequency of each actuator. When the vibrations of each actuator are transmitted to the cover plate, the vibrations provided by each actuator on the cover plate can be superimposed on each other, so that the vibrations can be mutually reduced or enhanced. As a result, it is possible to make the vibration stronger at the touch location and weaker elsewhere. This way, the tactile feedback will only happen at the touch location.

Figure 17:
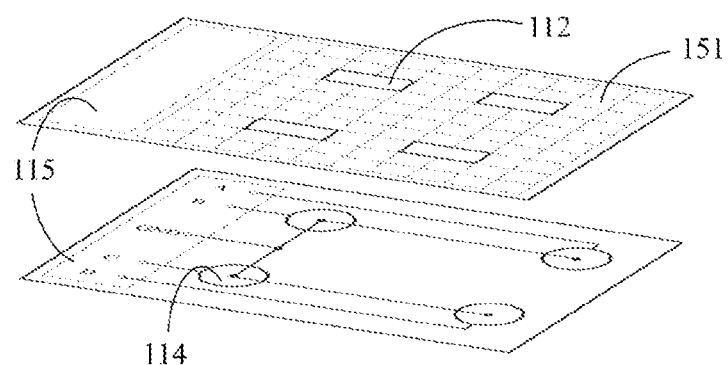
FIG. 17 schematically shows a perspective view of a touch panel according to an embodiment of the present application.

In some embodiments, in order to reduce the thickness of the touch panel, the layer where the pressure detector 112 is located and/or the layer where the actuator 114 is located may be integrated with other layer structures. For example, in some embodiments, the pressure detector 112 may be disposed in the touch layer 150. That is, the touch sensor 151 is arranged in the same layer as the at least one pressure detector. As shown in FIG. 17, the touch sensor 151 and the pressure detector 112 are arranged in the same layer, and the positions of the two do not overlap. The actuator 114 may be located in a different layer.

The touch panel of this application may also have a display function. In some embodiments, the tactile feedback operation can be combined with the display function. For example, in some embodiments, the touch panel further includes a display substrate. The display substrate is driven by display signals for displaying images. The display substrate is electrically connected to the driving circuit. In this way, the driving circuit can determine the actuation signal based on the display signal. This allows the tactile feedback function to be combined with the display function so that the tactile feedback is related to what is displayed on the display.

In the foregoing embodiments, the pressure detection and the tactile feedback are implemented by the pressure detector and the actuator respectively. In some other embodiments, both pressure detection and tactile feedback can also be realized by only one device. For example, piezoelectric materials have both positive and inverse piezoelectric effects. The positive piezoelectric effect means that when a piezoelectric material is under pressure, charges of opposite signs will be generated on its two end faces, and the voltage between the electrodes located on these two end faces can reflect the property of pressure. The inverse piezoelectric effect means that when an electrical signal is applied to the two end surfaces of the piezoelectric material, the piezoelectric material expands or contracts, causing deformation or displacement. Therefore, the piezoelectric device containing the piezoelectric material can realize the two functions of pressure detection and tactile feedback by making the piezoelectric material perform different tasks in different periods of time.

Figure 18:
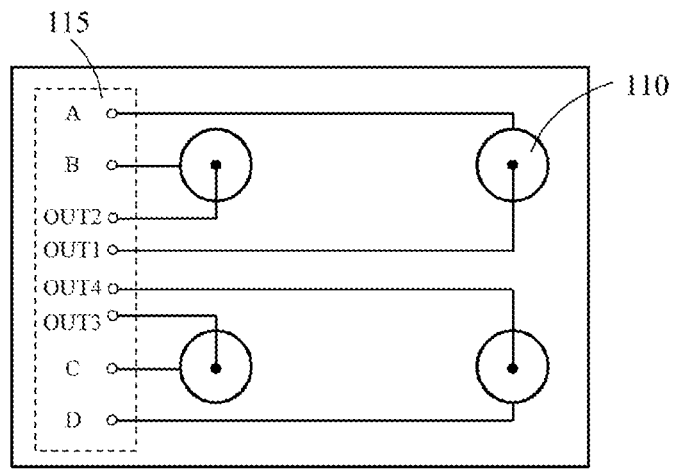
FIG. 18 schematically shows an internal circuit diagram of a touch panel according to an embodiment of the present application.
Figure 19:
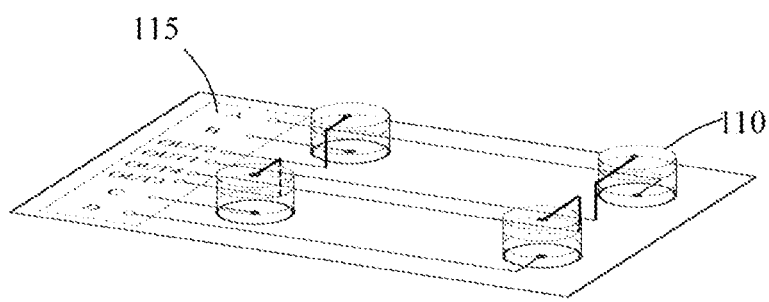
FIG. 19 schematically shows a perspective view of a touch panel according to an embodiment of the present application.
Figure 20:
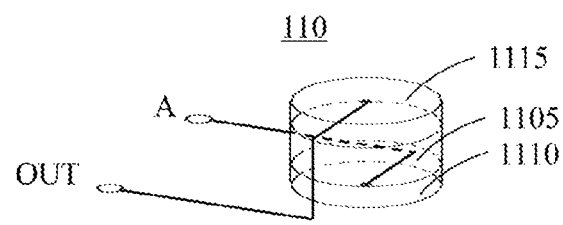
FIG. 20 schematically shows a partial enlarged view of FIG. 19.

FIG. 18 schematically shows an internal circuit diagram of a touch panel according to an embodiment of the present application. FIG. 19 schematically shows a perspective view of a touch panel according to an embodiment of the present application. FIG. 20 shows a partially enlarged view of FIG. 19. As shown in FIG. 18 and FIG. 19, in some embodiments, the touch panel includes at least one piezoelectric device 110 and a driving circuit 115. As shown in FIG. 20, the piezoelectric device 110 includes a piezoelectric material body 1105 having a first end face and a second end face, and a first electrode 1110 arranged on the first end face and a second electrode 1115 arranged on the second end face. The first electrode 1110 is electrically connected to the signal output terminal A of the driving circuit, and the second electrode 1115 is electrically connected to the signal receiving terminal OUT of the driving circuit. The driving circuit 115 is configured to determine the pressure on the piezoelectric device 110 by detecting a first voltage difference between the signal output terminal and the signal receiving terminal during a first period, and, actuating the piezoelectric device 110 to implement the tactile feedback by providing a second voltage difference between the signal output terminal and the signal receiving terminal.

Specifically, in the first period, the first electrode 1110 of the piezoelectric device 110 receives the input signal provided by the corresponding signal output terminal A, B, C, or D, and outputs the detection signal to the corresponding signal receiving terminal OUT1, OUT2, OUT3, or OUT4 through the second electrode 1115. The driving circuit 115 can determine the properties of the force applied to the touch panel by the user, such as the magnitude of the force, through the detection signal of the detection signal receiving terminals OUT1, OUT2, OUT3, and OUT4, and decide whether to output a feedback signal. When the force applied to the touch panel satisfies the condition of outputting the feedback signal, in the second period, the first electrode 1110 of the piezoelectric device 110 receives the feedback signal provided by the corresponding signal output terminal A, B, C, or D, and the second electrode 1115 is grounded through the corresponding signal receiving terminal OUT1, OUT2, OUT3, or OUT4. At this time, the voltage difference between the first electrode 1110 and the second electrode 1115 can drive the piezoelectric material body 1105 to deform or displace, thereby actuating the touch panel to provide tactile feedback. It should be understood that the first period and the second period are two different periods. The pressure detection and the tactile feedback are realized in different time periods, which can be called "time-division multiplexing" of the piezoelectric device 110.

Similar to the embodiments described above, in some embodiments, the signal output terminal of the driving circuit is located at the first edge of the touch panel, the signal receiving terminal of the driving circuit is located at the second edge of the touch panel, and the first edge is opposite the second edge. FIG. 21 schematically shows an internal circuit diagram of a touch panel according to an embodiment of the present application. As shown in FIG. 21, the signal output terminals OUT1, OUT2, OUT3, OUT4 electrically connected to the first electrodes are located in the second subsection 1152 of the driving circuit. The signal receiving terminals A, B, C, D electrically connected to the second electrodes are located in the first sub-section 1151 of the driving circuit. The first sub-section 1151 and the second sub-section 1152 are located on opposite sides of the touch panel. This can avoid the situation that the ports of the driving circuit and the wiring of the piezoelectric device 110 are too concentrated on one side of the touch panel, thereby reducing the port density and wiring density on one side of the touch panel, which is beneficial to the overall wiring balance of the touch panel.

In the touch panel according to the embodiment of the present application, various tactile feedback effects can be realized by configuring the driving circuit. For example, as mentioned earlier, a touch panel can be configured to provide users with stronger tactile feedback as they apply more pressure. In addition, the driving circuit can also be configured in other ways to achieve other effects.

For example, in some embodiments, the driving circuit is configured to output the actuation signal in response to the detection signal indicating that the force applied to the touch panel is greater than or equal to a preset trigger threshold. That is, when the force applied to the touch panel is less than the trigger threshold, no feedback signal is output, and the touch panel does not provide tactile feedback. For example, the user can preset the trigger threshold. If the processor finds that the force applied by the user on the touch panel reflected by the detection signal is greater than or equal to the trigger threshold after processing the detection signal, it indicates that the user really intends to operate on the touch panel instead of fault touching the touch panel. By configuring the driving circuit in this way, only when it is determined that the user really intends to use the touch panel, the driving circuit will output an actuation signal, thereby actuating the cover plate to perform tactile feedback, and will provide tactile feedback to the user. This first avoids the influence of fault touch on the touch panel, and reduces the quantity of tactile feedbacks of the actuator, prolonging its service life. In some embodiments, the trigger threshold may be set within the range of 1 Newton (N) to 1.5 Newton. On the other hand, with this setup, if the user operates on the touch panel and does not feel tactile feedback, it may indicate that the user is doing something wrong, such as applying too little force. In this way, when the user does not feel tactile feedback, he can understand that the previous action may be inappropriate and take a new action.

In some embodiments, the driving circuit may also be configured to, in response to the detection signal indicating that the force applied to the touch panel is greater than a protection threshold, alert the user. The protection threshold can be set according to the measurement range of the pressure detector. For example, when the force applied to the touch panel is greater than the protection threshold, i.e., the force exceeds the measurement range, so that the pressure detector may not accurately reflect the properties of the force applied by the user. Alternatively, the protection threshold can be set based on the properties of the pressure the touch panel can withstand. For example, when a force applied to the touch panel is greater than the protection threshold, damage to the touch panel may occur. Through this configuration, the user can be prompted that the operation force is too large, so that the user can change the operation mode, thereby improving the measurement accuracy, or protecting the touch panel. The alarm provided to the user can be realized through tactile feedback, such as making the cover plate vibrate at a higher frequency or amplitude, or through other methods such as sound and light.

The touch panel according to the embodiment of the present application can be used in various devices with human-computer interaction functions, including devices with display functions, such as computers, laptop computers, mobile phones, vehicle-mounted multimedia interactive systems, etc., and non-display devices, such as touchpads etc. This application is not limited to this.

According to another aspect of the present application, a human-computer interaction method based on a touch panel is provided. The touch panel may be a touch panel according to an embodiment of the present application. The touch panel includes a pressure detector, an actuator and a driving circuit. FIG. 22 schematically shows a flowchart of a human-computer interaction method based on a touch panel according to an embodiment of the present application. As shown in FIG. 22, the method includes the following steps.

In step S2205, the pressure detector generates a detection signal based on the force applied by the user on the touch panel, and sends the detection signal to the driving circuit.

In step S2210, the driving circuit determines whether the force applied by the user on the touch panel is greater than or equal to a preset trigger threshold based on the detection signal.

In step S2215, in response to the detection signal indicating that the force applied by the user on the touch panel is greater than or equal to the trigger threshold, the driving circuit generates an actuation signal, and outputs the actuation signal to the actuator, so that the actuator generates tactile feedback to the user.

The human-computer interaction method is described in more detail below. First, when the user performs an action on the touch panel, the user applies pressure on the touch panel. The pressure can be detected by the pressure detector and output from the pressure detector to the driving circuit in the form of a detection signal. Therefore, the detection signal reflects the properties of the pressure the user is applying to the touch panel, such as the magnitude of the pressure. By receiving the detection signal and analyzing and processing it, the properties of the pressure can be determined. For example, the driving circuit can determine the value of the pressure applied by the user on the touch panel through the detection signal, or determine whether the pressure applied by the user on the touch panel is greater than a preset trigger threshold. Then, based on the results of the above analysis, it can be determined whether to generate an actuation signal and what kind of actuation signal to generate. When it is determined that the force applied by the user on the touch panel is greater than or equal to the trigger threshold, it is considered that the actuation signal can be generated. In this case, the driving circuit can generate an actuation signal according to the properties of the pressure applied by the user on the touch panel, and output the actuation signal to the actuator, so that the actuator actuates the cover plate to provide tactile feedback to the user.

Since the actuation signal is determined based on the detection signal, that is, the properties of the pressure applied by the user on the touch panel, the tactile feedback generated by the touch panel may be related to the pressure applied by the user on the touch panel. After the actuation signal is output to the actuator, the actuation of the touch panel by the actuator can be based on the properties of the pressure applied by the user on the touch panel. Through the above human-computer interaction method, the user can have a more accurate understanding of the operations performed on the touch panel, and the user's interactive experience has also been enhanced and enriched.

Figure 23:
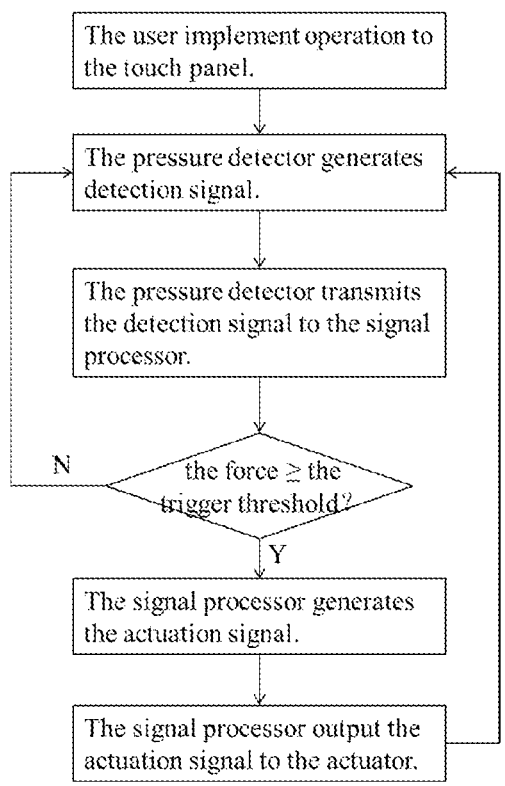
FIG. 23 schematically shows a flowchart of a human-computer interaction method based on a touch panel according to an embodiment of the present application.

FIG. 23 schematically shows a flowchart of a human-computer interaction method based on a touch panel according to an embodiment of the present application. As shown in FIG. 23, the user's operation on the touch panel will cause the pressure detector to generate a detection signal. At this time, a round of pressure detection and tactile feedback process can be started. First, the detection signal is sent to the driving circuit by the pressure detector. Then, the driving circuit analyzes the detection signal to determine whether the force applied by the user to the touch panel is greater than or equal to a preset trigger threshold. If the force is greater than or equal to the trigger threshold, it indicates that the user is indeed making a touch. At this point, the driving circuit can generate an actuation signal. Then, the actuation signal is output to the actuator, so that the actuator actuates the touch device to generate tactile feedback. Then, the current round of pressure detection and tactile feedback ends, and a new round of pressure detection starts. In the new round of pressure detection, the pressure detector will continue to detect the force applied by the user on the touch panel and output a new detection signal.

If the result of the analysis of the detection signal by the driving circuit shows that the force applied to the touch panel is less than the trigger threshold, it indicates that the user did not intend to perform a touch operation. At this time, no actuation signal is generated and the current round of pressure detection ends, and then a new round of pressure detection starts.

In some embodiments, the touch panel further includes a touch sensor. Moreover, the method further includes: generating a location signal by the touch sensor based on the user's touch location, and sending the location signal to the signal controller. It can be understood that the location signal may indicate the location of the force applied by the user on the touch panel, that is, the touch location. In this case, if the force applied by the user to the touch panel is greater than or equal to a preset trigger threshold, an actuation signal may be generated based on the touch location, so that the tactile feedback provided by the actuator occurs at the touch location. That is, step S2215 may specifically include: generating the actuation signal based on the location signal by the driving circuit, so that the actuator generates tactile feedback to the user at the touch location. In this embodiment, in the touch panel, in addition to the detection of the properties of the force applied by the user to the touch panel by the pressure detector, there is also the detection of the user's touch location by the touch sensor. This allows the actuation signal to be formed based on these two factors. For example, an actuation signal can cause the actuator closest to a touch location to actuate the touch panel, or cause the actuation of multiple actuators to overlap each other, so that tactile feedback occurs at the touch location.

To sum up, this application provides a touch panel and a human-computer interaction method based on a touch panel. With the help of the pressure detector and the actuator, the touch panel can provide users with tactile feedback based on the operations performed by the user on the touch panel, so that the user's operation errors will not affect the touch operation, or the errors can be discovered by the user as soon as possible, so that the user can correct it as soon as possible, thereby enhancing the human-computer interaction experience.

As will be understood by those skilled in the art, although the various steps of the methods in the embodiments of the present disclosure are described in a specific order in the drawings, this does not require or imply that these steps must be performed in this specific order, unless the context makes a clear otherwise illustration. Additionally or alternatively, multiple steps may be combined into one step for execution, and/or one step may be decomposed into multiple steps for execution. Furthermore, other method steps may be inserted between the steps. The inserted steps may represent improvements of a method described herein, or may be unrelated to the method. Also, a given step may not be fully complete before the next step starts.

In the description of the embodiments of the present application, the orientations or positional relationships indicated by the terms "upper", "lower", "left", "right", etc. are based on the orientations or positional relationships shown in the drawings, which are only for the convenience of description of the embodiments of the present application, without requiring that the embodiments must be constructed and operated in a particular orientation, and therefore should not be construed as limitations of the present application.

In the description of the present application, terms such as "a/one embodiment", "some/other embodiments" and the like mean that a specific feature, structure, material, or characteristic described in connection with the embodiments is included in at least one embodiment of the present application. Schematic representations of the above terms in the specification do not necessarily refer to the same embodiment or example. Furthermore, the specific features, structures, materials or characteristics described may be combined in any suitable manner in any one or more embodiments or examples. In addition, those skilled in the art may combine different embodiments or examples described in the present application and features of these embodiments or examples without conflicting with each other. In addition, it should be noted that in this application, the terms "first", "second" or similar terms are only used for the purpose of description or naming, and should not be understood as indicating or implying relative importance or indicating the quantity of the technical features.

The above descriptions are only specific implementations of the present application, but the protection scope of the present application is not limited thereto. Any changes or substitutions that can be easily conceived by those skilled in the art within the technical scope disclosed in this application shall fall within the protection scope of this application.

We claim:

1. A touch panel, comprising:
    a base substrate,
    at least one pressure detector and at least one actuator arranged on the base substrate, and
    a driving circuit,
    wherein the at least one pressure detector is electrically connected to the driving circuit, and the driving circuit is electrically connected to the at least one actuator, wherein the at least one actuator comprises a plurality of actuators, and the plurality of actuators are arranged in an array comprising at least two rows and at least two columns, wherein every four actuators that are directly adjacent constitute a sub-array which is a parallelogram, and orthographic projections of the four actuators constituting the sub-array on the base substrate define a sub-region as vertices, wherein an orthographic projection of each of the at least one pressure detectors on the base substrate is in a corresponding sub-region, wherein each pressure detector of the at least one pressure detector comprises an input terminal and two output terminals, the driving circuit comprises at least one detection signal output terminal, at least two detection signal receiving terminals and a ground terminal, wherein the input terminal of each pressure detector is electrically connected to a corresponding detection signal output terminal of the driving circuit, and the two output terminals of each pressure detector are electrically connected to two corresponding detection signal receiving terminals of the driving circuit, respectively, wherein each pressure detector of the at least one pressure detector comprises a first positive piezoresistor, a second positive piezoresistor, a first negative piezoresistor and a second negative piezoresistor, and when a positive piezoresistor is subjected to pressure, its resistance value increases, when a negative piezoresistor is subjected to pressure, its resistance value decreases, wherein a first electrode of the first positive piezoresistor is electrically connected to the input terminal of the pressure detector, a second electrode of the first positive piezoresistor is electrically connected to a first electrode of the first negative piezoresistor and a first output terminal of the two output terminals, a first electrode of the second negative piezoresistor is also electrically connected to the input terminal of the pressure detector, a second electrode of the second negative piezoresistor is electrically connected to a first electrode of the second positive piezoresistor and a second output terminal of the two output terminals, a second electrode of the first negative piezoresistor and a second electrode of the second positive piezoresistor are both electrically connected to the ground terminal.

2. The touch panel according to claim 1, wherein a ratio of a quantity of the at least one actuator and a quantity of the at least one pressure detector is in a range of 1:4 to 2:1.

3. The touch panel according to claim 1, wherein each sub-region corresponds to one of said at least one pressure detector,
wherein an orthographic projection of the at least one pressure detector on the base substrate is at a geometric center of the corresponding sub-region.

4. The touch panel according to claim 1, wherein each sub-region corresponds to two pressure detectors,
wherein an arrangement direction of orthographic projections of the two pressure detectors on the base substrate is parallel to a row direction or a column direction of the array of the plurality of actuators.

5. The touch panel according to claim 4, wherein the sub-region is divided into two regions by its midline, and the orthographic projections of the two pressure detectors on the base substrate are respectively at geometric centers of the two regions.

6. The touch panel according to claim 1, wherein each sub-region corresponds to four pressure detectors,
wherein the four pressure detectors constitute a parallelogram as vertices,
wherein, extension directions of the two sets of opposite sides of the parallelogram are respectively parallel to the row direction and the column direction of the array of the plurality of actuators.

7. The touch panel according to claim 1, wherein the at least one pressure detector and the at least one actuator are arranged in a same layer.

8. The touch panel according to claim 1, wherein an orthographic projection of each pressure detector of the at least one pressure detector on the base substrate at least partially overlaps with an orthographic projection of a corresponding actuator of the at least one actuator on the base substrate.

9. The touch panel according to claim 1, wherein the at least one pressure detector and the at least one actuator are arranged in different layers.

10. The touch panel according to claim 1, wherein the input terminal of each pressure detector is electrically connected to a same detection signal output terminal of the driving circuit.

11. The touch panel according to claim 1, wherein each actuator of the at least one actuator comprises an input terminal and an output terminal, the driving circuit comprises at least one actuation signal output terminal and a ground terminal,
wherein the input terminal of each actuator is electrically connected to a corresponding actuation signal output terminal of the driving circuit, and the output terminal of each actuator is electrically connected to the ground terminal of the driving circuit.

12. The touch panel according to claim 1, wherein the driving circuit further comprises at least one actuation signal output terminal,
wherein the at least one detection signal output terminal and the at least two detection signal receiving terminals are electrically connected to the at least one pressure detector, and the at least one actuation signal output terminal and the ground terminal are electrically connected to the at least one actuator,
wherein the at least one detection signal output terminal and the at least two detection signal receiving terminals are located at a first edge of the touch panel, and the at least one actuation signal output terminal and the ground terminal are located at a second edge of the touch panel, wherein the first edge is opposite to the second edge.

13. The touch panel according to claim 1, wherein the touch panel is divided into a touch area and a frame area surrounding the touch area,
wherein the at least one pressure detector and/or the at least one actuator are located in the frame area.

14. The touch panel according to claim 1, further comprising a touch layer, wherein the touch layer is configured to determine a touch location.

* * * * *